(12) United States Patent
Blondin et al.

(10) Patent No.: US 11,347,366 B2
(45) Date of Patent: May 31, 2022

(54) SELF-CAPACITANCE AND MUTUAL CAPACITANCE TOUCH-SENSOR PANEL ARCHITECTURE

(71) Applicant: Apple Inc., Cupertino, CA (US)

(72) Inventors: Christophe Blondin, Sunnyvale, CA (US); Jean-Marie Bussat, San Jose, CA (US); Robert Leo Sheridan, Sunnyvale, CA (US); Sagar Rajiv Vaze, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/989,645

(22) Filed: Aug. 10, 2020

(65) Prior Publication Data

US 2020/0371636 A1 Nov. 26, 2020

Related U.S. Application Data

(63) Continuation of application No. 15/998,425, filed on Aug. 15, 2018, now Pat. No. 10,739,904.

(Continued)

(51) Int. Cl.
*G06F 3/044* (2006.01)
*G06F 3/041* (2006.01)
*G06F 3/047* (2006.01)

(52) U.S. Cl.
CPC ............ *G06F 3/0448* (2019.05); *G06F 3/044* (2013.01); *G06F 3/047* (2013.01); *G06F 3/0412* (2013.01);

(Continued)

(58) Field of Classification Search
None
See application file for complete search history.

(56) References Cited

U.S. PATENT DOCUMENTS 5,483,261 A   1/1996   Yasutake
5,488,204 A   1/1996   Mead et al.
(Continued)

FOREIGN PATENT DOCUMENTS

CN   106951125 A   7/2017
EP   2660688 A1   11/2013
(Continued)

OTHER PUBLICATIONS

Corrected Notice of Allowability received for U.S. Appl. No. 15/998,425, dated May 26, 2020, 2 pages.
(Continued)

*Primary Examiner* — Kirk W Hermann
(74) *Attorney, Agent, or Firm* — Kubota & Basol LLP

(57) ABSTRACT

A touch sensor panel includes a first set of touch electrodes configured to operate as drive lines and that are disposed in a first layer of the touch sensor panel. The touch sensor panel also includes a second set of touch electrodes configured to operate as sense lines and that are disposed in a second layer of the touch sensor panel, different than the first layer of the touch sensor panel, such that one or more mutual capacitance touch nodes are formed by the first set of touch electrodes and the second set of touch electrodes. The touch sensor panel also includes a third set of touch electrodes configured to operate as self-capacitance electrodes and that are disposed in the first layer or the second layer of the touch sensor panel.

18 Claims, 19 Drawing Sheets

Related U.S. Application Data

(60) Provisional application No. 62/545,920, filed on Aug. 15, 2017.

(52) U.S. Cl.
CPC .......... *G06F 3/0416* (2013.01); *G06F 3/0443* (2019.05); *G06F 3/0445* (2019.05); *G06F 3/0446* (2019.05); *G06F 3/04164* (2019.05); *G06F 3/041662* (2019.05); *G06F 2203/04106* (2013.01); *G06F 2203/04107* (2013.01)

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 7,932,897 | B2 | 4/2011 | Elias et al. |
| 8,479,122 | B2 | 7/2013 | Hotelling et al. |
| 8,593,410 | B2 | 11/2013 | Hong et al. |
| 8,754,662 | B1 | 6/2014 | Weng et al. |
| 9,075,484 | B2 | 7/2015 | Ritter et al. |
| 9,182,865 | B2 | 11/2015 | Chae |
| 9,261,997 | B2 | 2/2016 | Chang et al. |
| 9,304,641 | B2 | 4/2016 | Kang et al. |
| 9,417,747 | B2 | 8/2016 | Yumoto et al. |
| 9,575,610 | B2 | 2/2017 | Hotelling et al. |
| 9,582,099 | B2 | 2/2017 | Small |
| 9,626,049 | B2 | 4/2017 | Chandran et al. |
| 9,886,141 | B2 | 2/2018 | Yousefpor |
| 9,983,738 | B2 | 5/2018 | Wang et al. |
| 10,429,981 | B2 | 10/2019 | Noguchi et al. |
| 2006/0197753 | A1 | 9/2006 | Hotelling |
| 2008/0297174 | A1 | 12/2008 | Narasimhan et al. |
| 2008/0309633 | A1 | 12/2008 | Hotelling et al. |
| 2010/0026660 | A1 | 2/2010 | Kitamura |
| 2010/0110038 | A1 | 5/2010 | Mo et al. |
| 2010/0265188 | A1 | 10/2010 | Chang et al. |
| 2010/0315374 | A1 | 12/2010 | Chen et al. |
| 2012/0050216 | A1* | 3/2012 | Kremin ............. G06F 3/041661 345/174 |
| 2013/0100071 | A1 | 4/2013 | Wright et al. |
| 2013/0154996 | A1* | 6/2013 | Trend .................... G06F 3/0446 345/174 |
| 2013/0181949 | A1 | 7/2013 | Setlak |
| 2013/0257786 | A1* | 10/2013 | Brown ................. G06F 3/04182 345/174 |
| 2013/0307823 | A1 | 11/2013 | Grivna et al. |
| 2014/0184552 | A1 | 7/2014 | Tanemura |
| 2014/0210743 | A1* | 7/2014 | Kurasawa ............ G06F 3/0446 345/173 |
| 2014/0253499 | A1* | 9/2014 | Lee ....................... G06F 3/0448 345/174 |
| 2014/0327644 | A1* | 11/2014 | Mohindra ........... G06F 3/04182 345/174 |
| 2015/0022494 | A1 | 1/2015 | Azumi et al. |
| 2015/0035787 | A1 | 2/2015 | Shahpamia et al. |
| 2015/0049043 | A1 | 2/2015 | Yousefpor |
| 2015/0062062 | A1 | 3/2015 | Han et al. |
| 2015/0130742 | A1 | 5/2015 | Chen et al. |
| 2015/0205405 | A1 | 7/2015 | Yumoto et al. |
| 2015/0248183 | A1 | 9/2015 | Schwartz et al. |
| 2015/0261377 | A1 | 9/2015 | Reynolds et al. |
| 2015/0268783 | A1* | 9/2015 | Yoon .................... G06F 3/0445 345/173 |
| 2015/0331535 | A1 | 11/2015 | Li et al. |
| 2016/0188039 | A1 | 6/2016 | Yoon et al. |
| 2016/0209962 | A1 | 7/2016 | Nurmi |
| 2016/0306458 | A1 | 10/2016 | Hong et al. |
| 2016/0306466 | A1 | 10/2016 | Gotoh et al. |
| 2016/0328079 | A1 | 11/2016 | Schwartz et al. |
| 2017/0024033 | A1 | 1/2017 | Chandran et al. |
| 2017/0228065 | A1 | 8/2017 | Lee et al. |
| 2017/0228073 | A1 | 8/2017 | Hagihara |
| 2017/0242534 | A1* | 8/2017 | Gray ..................... H03M 3/458 |
| 2017/0277328 | A1 | 9/2017 | Kurasawa et al. |
| 2018/0059862 | A1 | 3/2018 | Zeng et al. |
| 2018/0151627 | A1 | 5/2018 | Seo et al. |
| 2018/0157354 | A1 | 6/2018 | Blondin et al. |
| 2018/0217711 | A1* | 8/2018 | Teranishi .......... G06F 3/041662 |
| 2019/0056834 | A1 | 2/2019 | Blondin et al. |
| 2019/0102010 | A1 | 4/2019 | Knabenshue et al. |
| 2020/0004294 | A1 | 1/2020 | Tan et al. |
| 2020/0103994 | A1 | 4/2020 | Vaze |

FOREIGN PATENT DOCUMENTS

| | | |
|---|---|---|
| EP | 2930597 A2 | 10/2015 |
| EP | 2937767 A1 | 10/2015 |
| JP | 2000-163031 A | 6/2000 |
| JP | 2002-342033 A | 11/2002 |
| WO | 2015/183461 A1 | 12/2015 |
| WO | 2017/020344 A1 | 2/2017 |
| WO | 2017/058413 A1 | 4/2017 |
| WO | 2017/124310 A1 | 7/2017 |
| WO | 2019/035978 A2 | 2/2019 |

OTHER PUBLICATIONS

International Preliminary Report on Patentability received for PCT Patent Application No. PCT/US2018/000253, dated Feb. 27, 2020, 15 pages.
International Search Report and Written Opinion received for PCT Patent Application No. PCT/US2018/000253, dated Feb. 20, 2019, 19 pages.
International Search Report and Written Opinion received for PCT Patent Application No. PCT/US2018/053605, dated Mar. 19, 2019, 19 pages.
Non-Final Office Action received for U.S. Appl. No. 15/998,425, dated Nov. 19, 2019, 52 pages.
Notice of Allowance received for U.S. Appl. No. 15/998,425, dated Apr. 3, 2020, 17 pages.
Restriction Requirement received for U.S. Appl. No. 16/146,675, dated Jan. 10, 2020, 5 pages.
Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Corrected Notice of Allowance received for U.S. Appl. No. 16/551,698, dated May 17, 2021, 2 pages.
Non-Final Office Action received for U.S. Appl. No. 16/146,675, dated Aug. 4, 2021, 28 pages.
Notice of Allowance received for U.S. Appl. No. 16/551,698, dated Apr. 23, 2021, 10 pages.
Notice of Allowance received for U.S. Appl. No. 16/551,698, dated Jan. 21, 2021, 10 pages.
Non-Final Office Action received for U.S. Appl. No. 16/146,675, dated May 15, 2020, 22 pages.
Non-Final Office Action received for U.S. Appl. No. 16/551,698, dated Jul. 8, 2020, 12 pages.
Final Office Action received for U.S. Appl. No. 16/146,675, dated Dec. 24, 2020, 25 pages.

(56) References Cited

OTHER PUBLICATIONS

International Search Report received for PCT Patent Application No. PCT/US2019/048210, dated Dec. 10, 2019, 6 pages.

* cited by examiner

1100

Touch Sensor Panel

A first set of touch electrodes configured to operate as drive electrodes of one or more mutual capacitance touch nodes during a first mode of the touch sensor panel and operate as electrodes other than self-capacitance electrodes during a second mode of the touch sensor panel A second set of touch electrodes configured to operate as sense electrodes of the one or more mutual capacitance touch nodes during the first mode of the touch sensor panel, wherein the one or more mutual capacitance touch nodes are formed by the first set of touch electrodes and the second set of touch electrodes A third set of touch electrodes configured to operate as self-capacitance electrodes during the second mode of the touch sensor panel and operate as drive electrodes of the one or more mutual capacitance touch nodes during the first mode of the touch sensor panel, wherein the first mode and the second mode of the touch sensor panel are non-overlapping in time A first set of routing traces configured to electrically couple the first set of touch electrodes to sense circuitry A second set of routing traces configured to electrically couple the second set of touch electrodes to the sense circuitry;

A third set of routing traces configured to electrically couple the third set of touch electrodes to the sense circuitry Wherein: the third set of routing traces extends along a first direction in the touch electrodes of the first set of touch electrodes in a first layer toward one or more edges of the touch sensor panel Wherein: the first set of touch electrodes and the third set of touch electrodes are driven to operate as the drive electrodes during the first mode of the touch sensor panel

FIG. 11A

Wherein: the routing traces of the third set of routing traces coupled to touch electrodes of the third set of touch electrodes that are closer to a center of the touch sensor panel are routed around electrodes of the third set of electrodes that are closer to an edge of the touch sensor panel; and the touch electrodes of the third set of touch electrodes vary in size such that the touch electrodes of the third set of touch electrodes that are closer to the edge of the touch sensor panel are smaller than the touch electrodes of the third set of touch electrodes that are closer to the center of the touch sensor panel Wherein: the third set of touch electrodes and the third set of routing traces are disposed in the second layer of the touch sensor panel such that the third set of touch electrodes and the third set of routing traces are disposed along the second direction between touch electrodes of the second set of touch electrodes.

Wherein: the third set of touch electrodes is disposed in the second layer of the touch sensor panel, and the third set of routing traces is disposed in the first layer of the touch sensor panel.

A first area between the touch electrodes of the third set of touch electrodes disposed along the border of the touch sensor panel and the one or more mutual capacitance touch nodes, wherein: routing traces of the third set of routing traces corresponding to the touch electrodes disposed between the one or more mutual capacitance touch nodes are disposed at least partially within the first area and extend at least partially along the first area

FIG. 11B

SELF-CAPACITANCE AND MUTUAL CAPACITANCE TOUCH-SENSOR PANEL ARCHITECTURE

CROSS-REFERENCE TO RELATED APPLICATIONS

This application is a continuation of U.S. application Ser. No. 15/998,425, filed on Aug. 15, 2018 and published on Feb. 21, 2019 as U.S. Patent Publication No. 2019-0056834, which claims benefit of U.S. Provisional Patent Application No. 62/545,920, filed Aug. 15, 2017, the contents of which are hereby incorporated by reference in their entirety for all purposes.

FIELD OF THE DISCLOSURE

This relates generally to touch sensor panels, and more particularly to touch sensor panels with touch electrodes configured to operate in mutual capacitance and self-capacitance touch sensing modes.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of partially or fully transparent or non-transparent conductive plates (e.g., touch electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

SUMMARY OF THE DISCLOSURE

In some examples, sensing the mutual capacitance of touch electrodes arranged in rows and columns can determine the location of a touch on the touch sensor panel with relatively high precision, but may have trouble detecting objects (e.g., fingers) further away from the touch sensor panel (e.g., hovering over the touch sensor panel). In some examples, sensing the self-capacitance of touch electrodes can effectively detect the locations of one or more objects (e.g., fingers) hovering over and/or touching the touch sensor panels, but may be susceptible to noise and jitter that can introduce errors and/or offsets into the touch outputs of the touch sensor panels. Moreover, a matrix architecture of touch node electrodes for use in self-capacitance sensing can require a large number of touch node electrodes and routing traces. Therefore, it can be beneficial to combine mutual capacitance and self-capacitance sensing of touch electrodes in a single touch sensor panel. The examples of the disclosure provide various touch sensing system configurations that combine mutual capacitance and self-capacitance sensing of touch electrodes. Doing so can help can improve the touch sensing performance of the system while reducing the number of electrodes and corresponding routing traces, and can help to decrease and optimize cost and facilitate system integration.

BRIEF DESCRIPTION OF THE DRAWINGS

FIGS. 11A and 11B illustrate exemplary touch sensor panel configurations 1100 according to examples of the disclosure.

DETAILED DESCRIPTION

Figure 1A:
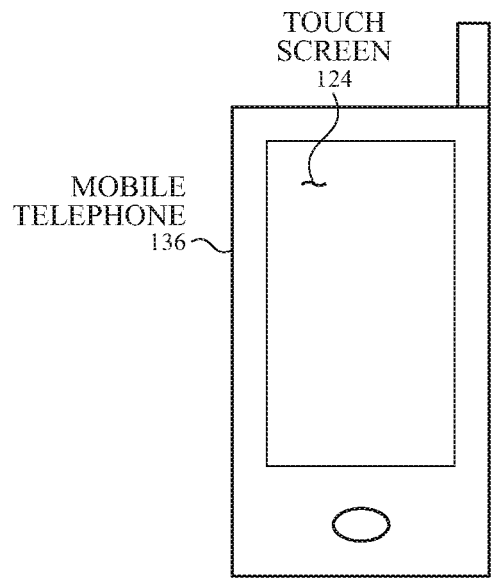
FIGS. 1A-1D illustrate an example mobile telephone, an example media player, an example personal computer and an example tablet computer that can each include an exemplary touch screen according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Described here are capacitive touch sensor panels. Generally, the touch sensor panels comprise a plurality of plates formed from a conductive material; these plates are referred to herein as "touch electrodes." The touch electrodes may be made from any suitable conductive material (e.g., a transparent conductive oxide such as ITO or aluminum zinc oxide, a metal such as copper, a metal mesh material comprising a conductive cross-hatched metal structure with gaps between cross-hatched metal lines, carbon nanotube material, or any other suitable conductive material) which may be substantially transparent or non-transparent, depending on the application. In some instances where the touch electrodes are substantially transparent, the touch sensor panel may be placed on or otherwise integrated into a display (e.g., the touch electrodes may be placed within the display stack and/or may be utilized during the operation of the display to provide display functionality) to provide a touch sensitive display.

During operation of the touch sensor panels described here, a given touch electrode or plurality of electrodes may be configured to operate in a mutual capacitance touch sensing mode or a self-capacitance touch sensing mode. It should be appreciated that a given electrode may be used to perform mutual capacitance touch sensing at one point in time and self-capacitance touch sensing at a different point in time (e.g., by reconfiguring the touch sensor circuitry used to operate the touch electrode, or connecting the touch electrode to different touch sensor circuitry), but some of the touch electrodes may be dedicated to mutual capacitance sensing where a given touch electrode can be stimulated with an AC waveform (e.g., the "drive electrode") and the mutual capacitance between that electrode and another touch electrode can be sensed at the other electrode (e.g., the "sense electrode"). To facilitate mutual capacitance sensing, a touch sensor panel may have touch electrodes arranged in rows and columns where a mutual capacitance may be measured at an overlap or adjacency of a row and a column. In these instances it may be desirable for the rows and columns to have a relatively high aspect ratio (e.g., relatively high aspect ratio 1:x where 1 represents a height or width of the electrode and x represents the other of the height or width of the electrode, e.g., where x is greater than 4, 5, 10, 15, 20, etc.), and in some instances a row or column may span a relatively large portion of the touch sensor panel (e.g., at least a quarter of the panel, at least half of the panel, or at least three quarters of the panel). Mutual capacitance sensing can determine the location of a touch on the touch sensor panel with relatively high precision, but may have trouble detecting objects (e.g., fingers) further away from the touch sensor panel (e.g., hovering over the touch sensor panel).

Conversely, the self-capacitance of a given touch electrode can be sensed by stimulating the touch electrode with an AC waveform, and measuring the self-capacitance to ground of that same touch electrode. When one or more electrodes of a touch sensor panel are operated in a self-capacitance sensing mode, the electrodes can effectively detect the locations of one or more objects (e.g., fingers) hovering over and/or touching the touch sensor panels, but may be susceptible to noise and jitter that can introduce errors and/or offsets into the touch outputs of the touch sensor panels. Generally, touch panels optimized for self-capacitance utilize a matrix architecture in which electrodes are arranged in a two-dimensional array to form rows and columns, each row and column comprising a respective plurality of electrodes. The individual electrodes are approximately the same size (although it should be appreciated that some electrodes may be larger or smaller to accommodate routing traces or to balance the bandwidth of individual electrodes). Generally it is desirable for the self-capacitance electrodes to have a relatively low aspect ratio (e.g., relatively low aspect ratio 1:x as discussed above, where x is less than or equal to 4, 5, 10, 15, 20, and preferably less than or equal to 1.5). Depending on the size of the panel and the pitch/size of individual electrodes, a matrix architecture of self-capacitance touch node electrodes can require a large number of self-capacitance touch electrodes and corresponding routing traces. Therefore, it can be beneficial to combine touch electrodes that are operated to sense mutual capacitance and self-capacitance in a single touch sensor panel. The examples of the disclosure provide various touch sensing system configurations that combine mutual capacitance and self-capacitance node electrodes. Doing so can help can improve the touch sensing performance of the system while reducing the number of electrodes and corresponding routing traces. It is understood that as described in this disclosure, a "self-capacitance electrode" can be a touch electrode that is being operated in a self-capacitance sensing mode (which can at a later time be operated in a mutual capacitance sensing mode), and a "mutual capacitance" electrode can be a touch electrode that is being operated in a mutual capacitance sensing mode (which can at a later time be operated in a self-capacitance sensing mode).

Figure 1B:
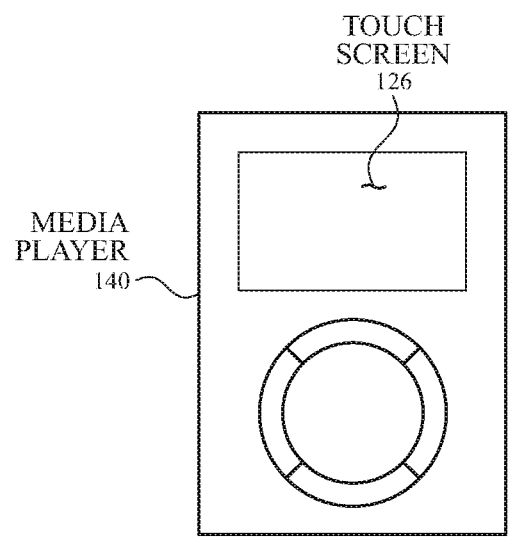
Figure 1C:
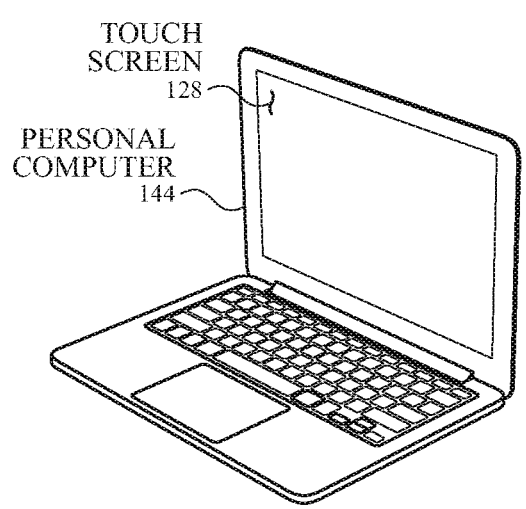
Figure 1D:
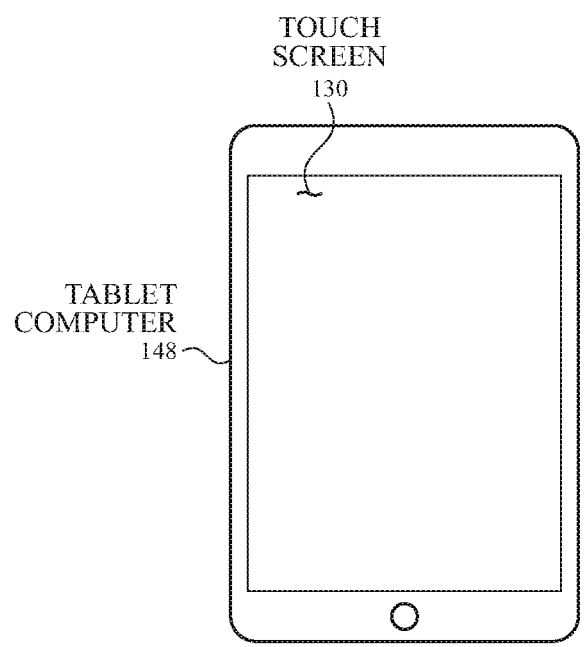

FIGS. 1A-1D illustrate example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. FIG. 1D illustrates an example tablet computer 148 that includes a touch screen 130. It is understood that the above touch screens can be implemented in other devices as well, including in wearable devices.

In some examples, touch screens 124, 126, 128 and 130 can be configured and optimized to operate using a combination of self-capacitance and mutual-capacitance sensing. A self-capacitance and mutual capacitance hybrid touch system can include a matrix of small, individual plates of conductive material that can be referred to as touch node electrodes (e.g., electrodes with relatively low aspect ratio, as described above), as well as row and column electrodes (e.g., electrodes with relatively high aspect ratio) that may cross over each other on different layers, or may be adjacent to each other on the same layer (as described below with reference to touch screen 220 in FIG. 2). The touch node electrodes and the row and column electrodes can be operated in various combinations of mutual and self-capacitance sensing modes, as will be described in more detail below.

A self-capacitance and mutual capacitance hybrid touch screen can include a plurality of individual touch node electrodes, each touch node electrode identifying or representing a unique location on the touch screen at which touch or proximity (i.e., a touch node or proximity event) is to be sensed, and each touch node electrode being electrically isolated from the other touch node electrodes in the touch screen/panel. The touch node electrodes can be on the same or different material layers on touch sensor panel. It is understood that in some examples, the node electrodes on the touch screen can be operated in a self-capacitance sensing mode in which their self-capacitance is sensed, and in some examples can be used to perform scans other than self-capacitance scans on the touch screen (e.g., mutual capacitance scans in combination with or instead of mutual capacitance scans of the row and column electrodes). During self-capacitance operation, a touch node electrode can be stimulated with an AC waveform, and the self-capacitance to ground of the touch node electrode can be measured. As an object approaches the touch node electrode, the self-capacitance to ground of the touch node electrode can change. This change in the self-capacitance of the touch node electrode can be detected and measured by the touch sensing system to determine the positions of multiple objects when they touch, or come in proximity to, the touch screen. In some examples, a touch screen can be multi-touch, single touch, projection scan, full-imaging multi-touch, capacitive touch, etc.

As discussed above, a self-capacitance and mutual capacitance hybrid touch screen can also include a plurality of row electrodes and a plurality of column electrodes. In some examples, the row electrodes can be configured as drive electrodes, and the column electrodes can be configured as sense electrodes (or vice versa), which can form mutual capacitance touch nodes at the intersections (or adjacent locations) of the drive and sense electrodes. The row and column electrodes can be on the same or different material layers on the touch screen. In some examples, the drive circuitry used to drive the drive electrodes and the sense circuitry used to sense the sense electrodes can be fixed, or can be variable such that the drive and sense designations of the row and column electrodes, respectively, can be switch during touch screen operation (e.g., the row electrodes can become sense electrodes, and the column electrodes can become drive electrodes). It is understood that the row and column designations of the above electrodes is not necessarily tied to any specific orientation of the device with which the touch screen is integrated, and that such designation can be relative to any suitable reference point.

During operation, the drive electrodes can be stimulated with an AC waveform (e.g., the same or different AC waveform that stimulates the touch node electrodes described previously in the self-capacitance configuration) and the mutual capacitance of the mutual capacitance touch nodes can be measured via the sense electrodes. As an object approaches the touch node, the mutual capacitance of the mutual capacitance touch node can change. This change in the mutual capacitance of the touch node can be detected and measured by the touch sensing system to determine the positions of multiple objects when they touch, or come in proximity to, the touch screen. It is understood that in some examples, the row and column electrodes on the touch screen can be used to perform scans other than mutual capacitance scans of the touch screen (e.g., self-capacitance scans in combination with or instead of the touch node electrodes described previously).

Figure 2:
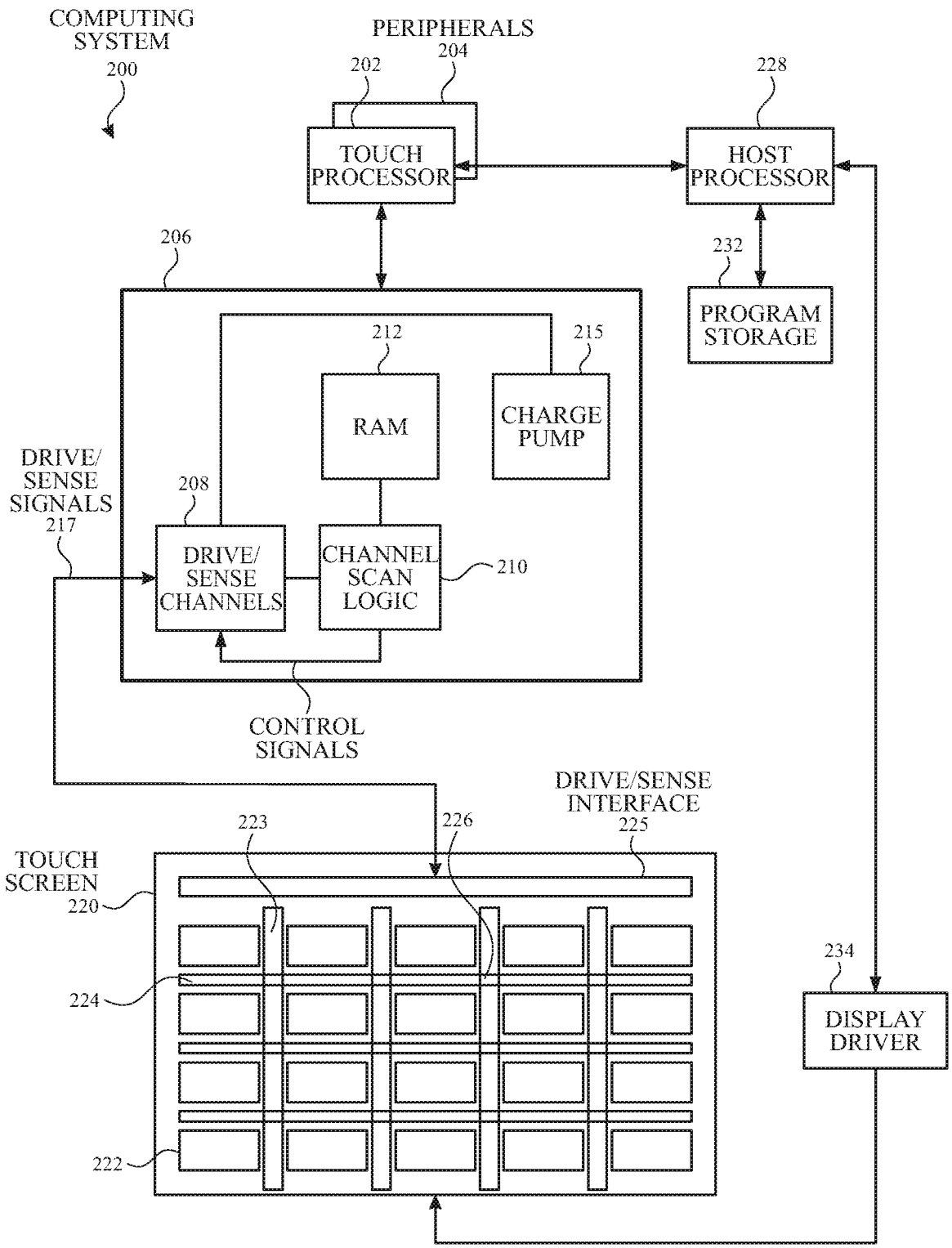
FIG. 2 is a block diagram of an example computing system that illustrates one implementation of an example self-capacitance and mutual capacitance hybrid touch screen according to examples of the disclosure.

FIG. 2 is a block diagram of an example computing system 200 that illustrates one implementation of an example self-capacitance and mutual capacitance hybrid touch screen 220 according to examples of the disclosure. Computing system 200 can be included in, for example, mobile telephone 136, digital media player 140, personal computer 144, tablet computer 148, or any mobile or non-mobile computing device that includes a touch screen, including a wearable device. Computing system 200 can include a touch sensing system including one or more touch processors 202, peripherals 204, a touch controller 206, and touch driving and/or sensing circuitry (described in more detail below). Peripherals 204 can include, but are not limited to, random access memory (RAM) or other types of memory or storage, watchdog timers and the like. Touch controller 206 can include, but is not limited to, one or more drive/sense channels 208 and channel scan logic 210. Channel scan logic 210 can access RAM 212, autonomously read data from drive/sense channels 208 and provide control for the drive/sense channels. In addition, channel scan logic 210 can control drive/sense channels 208 to generate stimulation signals at various frequencies and phases that can be selectively applied to the touch node electrodes and/or row and column electrodes of touch screen 220, as described in more detail below. In some examples, touch controller 206, touch processor 202 and peripherals 204 can be integrated into a single application-specific integrated circuit (ASIC), and in some examples can be integrated with touch screen 220 itself.

Touch screen 220 can include touch sensing circuitry that can include a capacitive sensing medium having a plurality of electrically isolated touch node electrodes 222 and a plurality of column electrodes 223 and a plurality of row electrodes 224 (e.g., a plurality of touch electrodes disposed as rows and a plurality of touch electrodes disposed as columns, respectively). In a mutual capacitance configuration, the intersection of column electrodes 223 and row electrodes 224 can form mutual capacitance touch nodes 226, as discussed above. In a self-capacitance mode, touch node electrodes 222 can be coupled to sense channels 208 in touch controller 206, can be driven by stimulation signals from the sense channels through drive/sense interface 225, and can be sensed for self-capacitance by the sense channels through the drive/sense interface as well, as described above. Similarly, in a mutual capacitance mode, column electrodes 223 can be coupled to drive channels 208 in touch controller 206, can be driven by stimulation signals from the drive channels through drive/sense interface 225, and row electrodes 224 can be sensed by the sense channels through the drive/sense interface as well, as described above. Labeling the locations used to detect touch (i.e., self-capacitance touch node electrodes 222 and mutual capacitance touch nodes 226) as "touch nodes" (or "touch node" electrodes) can be particularly useful when touch screen 220 is viewed as capturing an "image" of touch (e.g., a "touch image"). In other words, after touch controller 206 has determined an amount of touch detected at each self-capacitance touch node electrode 222 and/or mutual capacitance touch node 226 in touch screen 220, the pattern of touch nodes or touch node electrodes in the touch screen at which a touch occurred can be thought of as a touch image (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as a display driver 234 (e.g., for controlling operation of a display, such as an LCD display, an OLED display, etc.). The display driver 234 can provide voltages on select (e.g., gate) lines to each pixel transistor and can provide data signals along data lines to these same transistors to control the pixel display image as described in more detail below. Host processor 228 can use display driver 234 to generate a display image on touch screen 220, such as a display image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3:
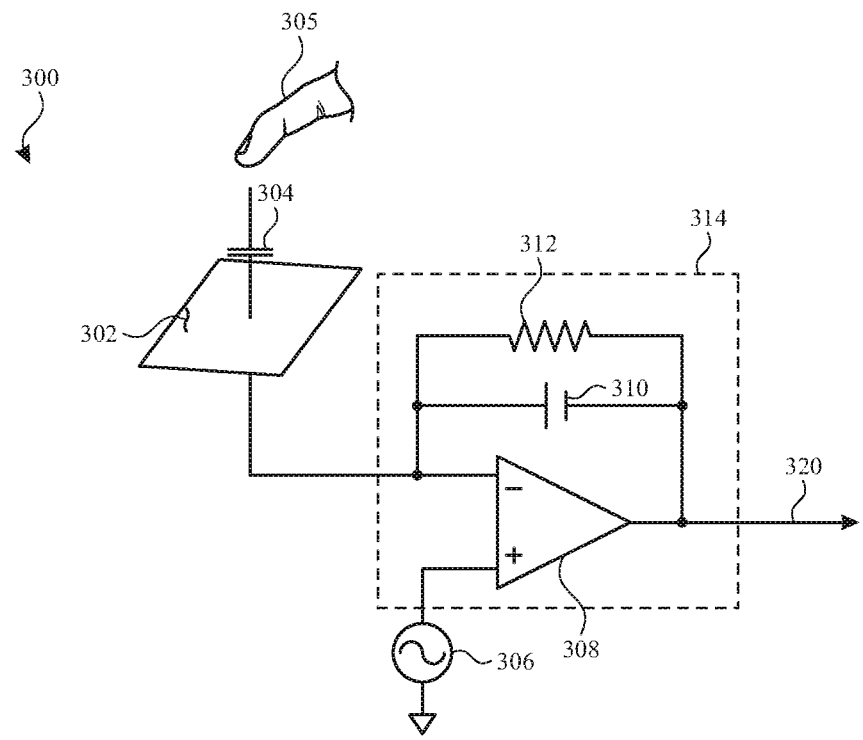
FIG. 3 illustrates an exemplary touch sensor circuit for performing a self-capacitance measurement using an electrode and sensing circuit according to examples of the disclosure.

FIG. 3 illustrates an exemplary touch sensor circuit 300 for performing a self-capacitance measurement using an electrode (e.g., a self-capacitance touch node electrode 302) and sensing circuit 314 according to examples of the disclosure. Sensing circuit 314 can be included in sense channels 208 to sense the self-capacitance of one or more touch electrodes on the touch sensor panels/touch screens of the disclosure. Touch node electrode 302 can correspond to a self-capacitance touch node electrode 222. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 4:
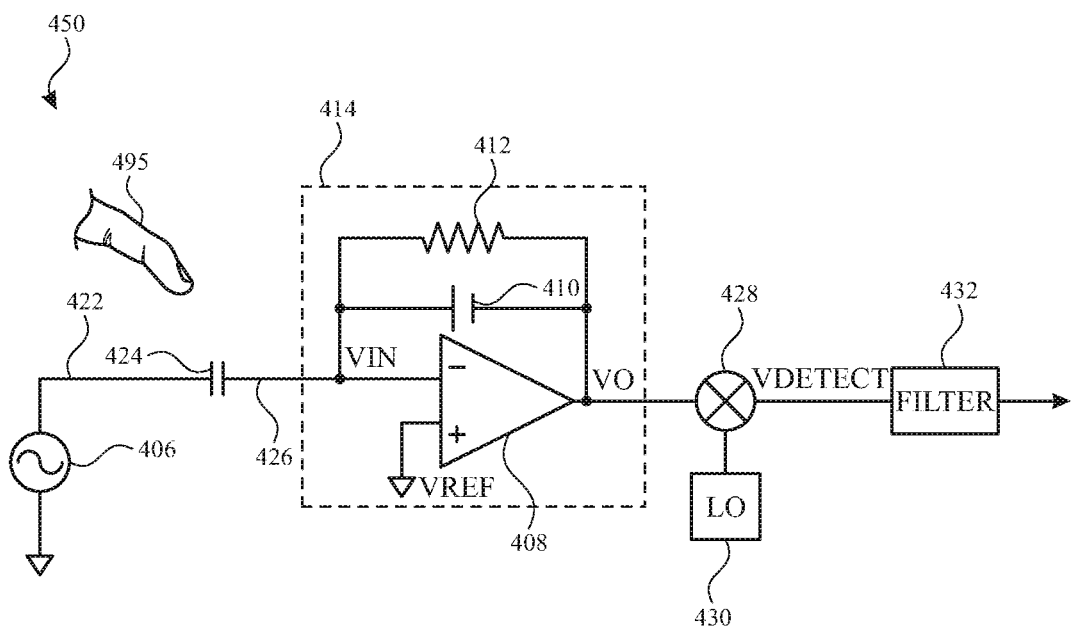
FIG. 4 illustrates an exemplary touch sensor circuit for performing a mutual capacitance measurement using two electrodes and sensing circuit according to examples of the disclosure.

FIG. 4 illustrates an exemplary touch sensor circuit 450 for performing a mutual capacitance measurement using two electrodes (a mutual capacitance drive 422 electrode and sense 426 electrode, such as the column electrodes and row electrodes described previously) and sensing circuit 414 according to examples of the disclosure. Stimulation signal 406 can be generated by drive channels 208 (e.g., drive channels 208 can include an AC stimulation source 406), drive electrode 422 can correspond to column electrode 223, sense electrode 426 can correspond to row electrode 224, and sensing circuit 414 can be included in sense channels 208. Drive electrode 422 can be stimulated by stimulation signal 406 (e.g., an AC voltage signal). Stimulation signal 406 can be capacitively coupled to sense electrode 426 through mutual capacitance 424 between drive electrode 422 and sense electrode 426. When a finger or object 405 approaches the touch node created by the intersection of drive electrode 422 and sense electrode 426, mutual capacitance 424 can be altered. The intersection of drive electrode 422 and sense electrode 426 can correspond to mutual capacitance touch nodes 226. This change in mutual capacitance 424 can be detected to indicate a touch or proximity event at the touch node, as described previously and below. The sense signal coupled onto sense electrode 426 can be received by sensing circuit 414. Sensing circuit 414 can include operational amplifier 408 and at least one of a feedback resistor 412 and a feedback capacitor 410. FIG. 4 illustrates a general case in which both resistive and capacitive feedback elements are utilized. The sense signal (referred to as Vin) can be inputted into the inverting input of operational amplifier 408, and the non-inverting input of the operational amplifier can be coupled to a reference voltage Vref. Operational amplifier 408 can drive its output to voltage Vo to keep Vin substantially equal to Vref, and can therefore maintain Vin constant or virtually grounded. A person of skill in the art would understand that in this context, equal can include deviations of up to 15%. Therefore, the gain of sensing circuit 414 can be mostly a function of the ratio of mutual capacitance 424 and the feedback impedance, comprised of resistor 412 and/or capacitor 410. The output of sensing circuit 414 Vo can be filtered and heterodyned or homodyned by being fed into multiplier 428, where Vo can be multiplied with local oscillator 430 to produce Vdetect. Vdetect can be inputted into filter 432. One skilled in the art will recognize that the placement of filter 432 can be varied; thus, the filter can be placed after multiplier 428, as illustrated, or two filters can be employed: one before the multiplier and one after the multiplier. In some examples, there can be no filter at all. The direct current (DC) portion of Vdetect can be used to determine if a touch or proximity event has occurred.

Referring back to FIG. 2, in some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays, such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

As previously mentioned, it can be beneficial to combine mutual capacitance and self-capacitance sensing of touch electrodes in a single touch sensor panel. Specifically, in some examples, mutual capacitance sensing of row and column electrodes can determine the location of a touch on the touch sensor panel with relatively high precision, but may have trouble detecting objects (e.g., fingers) further away from the touch sensor panel (e.g., hovering over the touch sensor panel). In some examples, self-capacitance sensing of touch node electrodes can effectively detect the locations of one or more objects (e.g., fingers) hovering over and/or touching the touch sensor panels, but may be susceptible to noise and jitter that can introduce errors and/or offsets into the touch outputs of the touch sensor panels. Therefore, the combination of mutual capacitance and self-capacitance sensing of touch electrodes in a hybrid touch sensor panel can improve the touch sensing performance of the touch sense panel system.

Figure 5A:
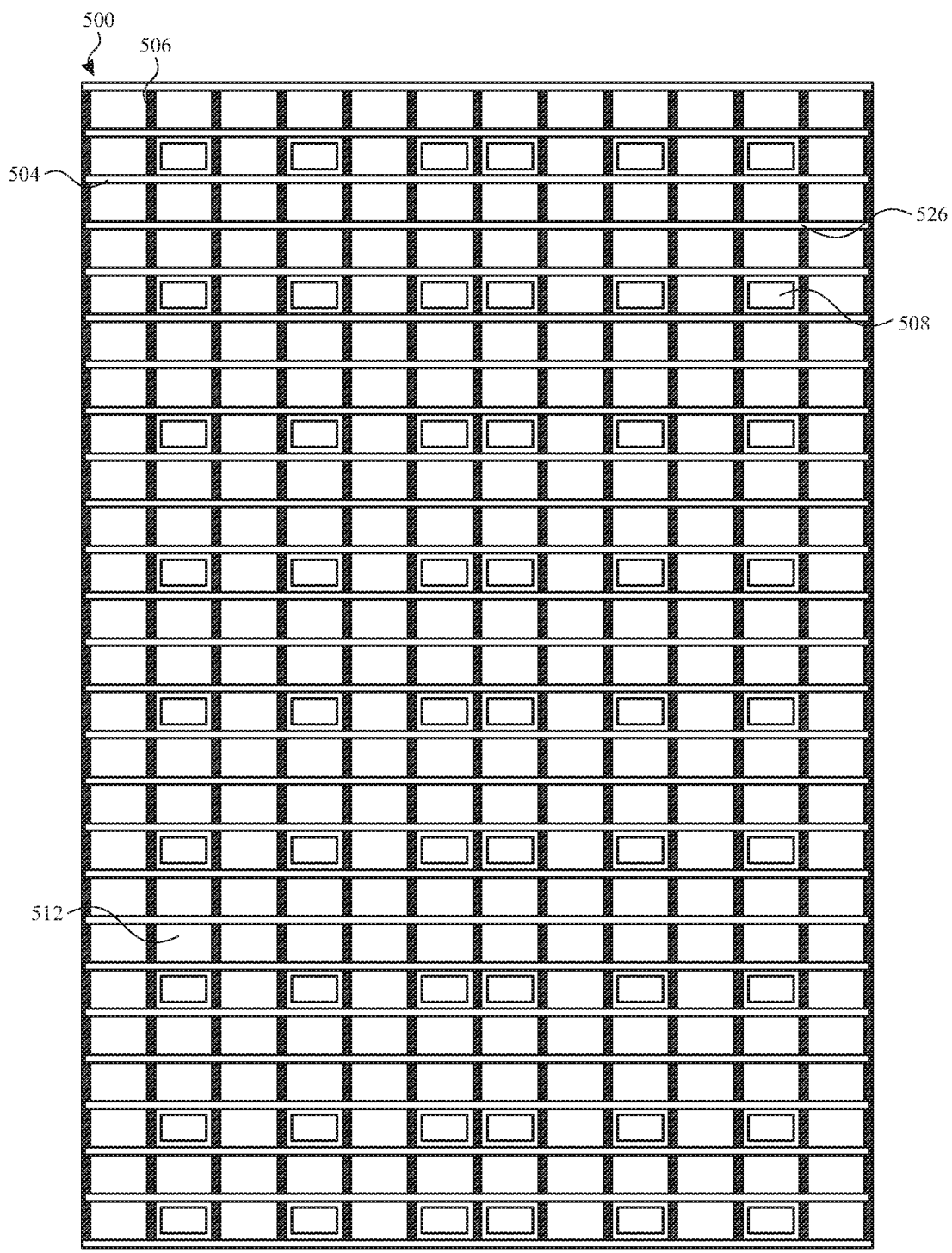
FIGS. 5A-5D illustrate exemplary touch sensor panel configurations according to examples of the disclosure.
Figure 5B:
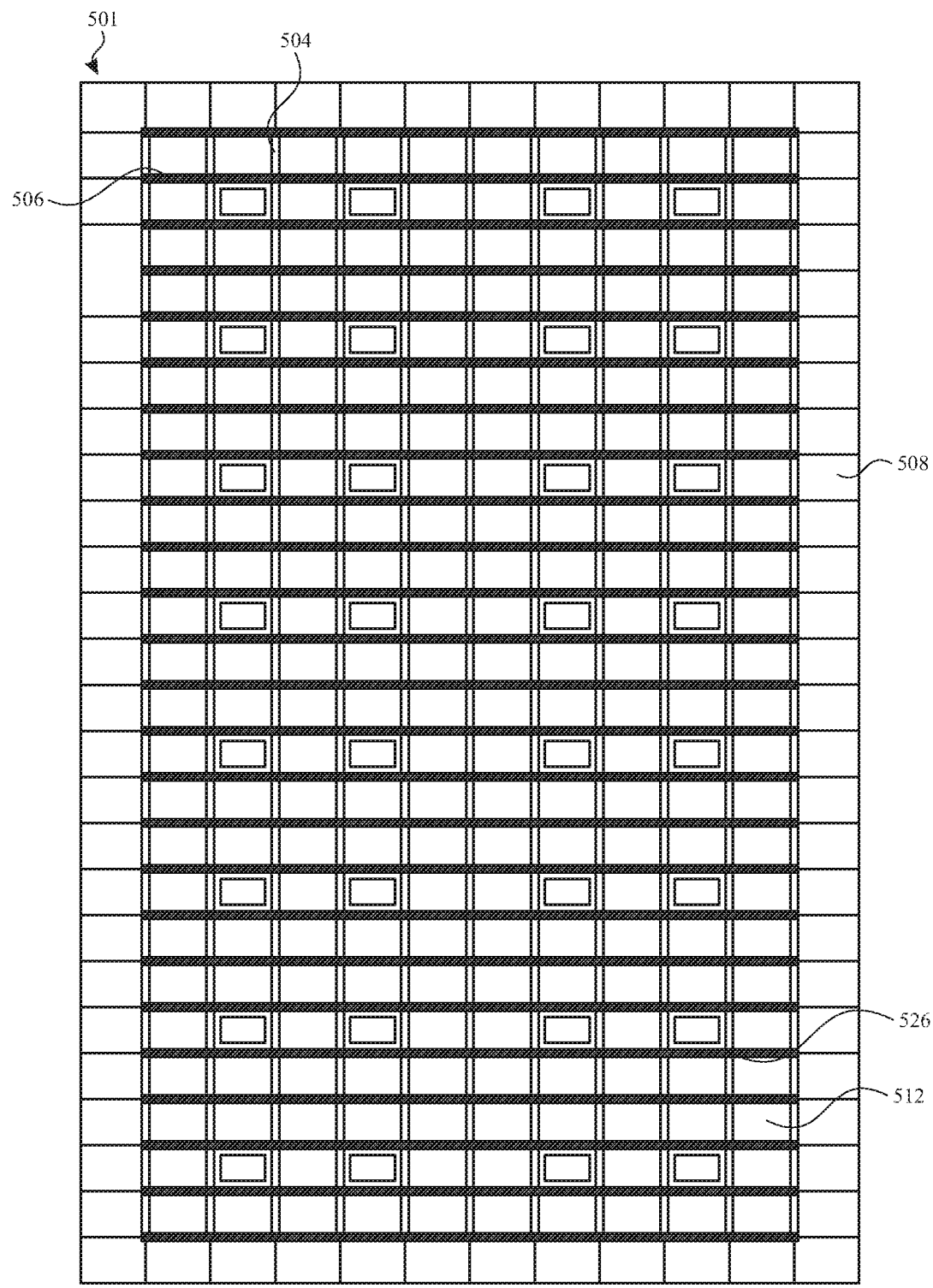
Figure 5C:
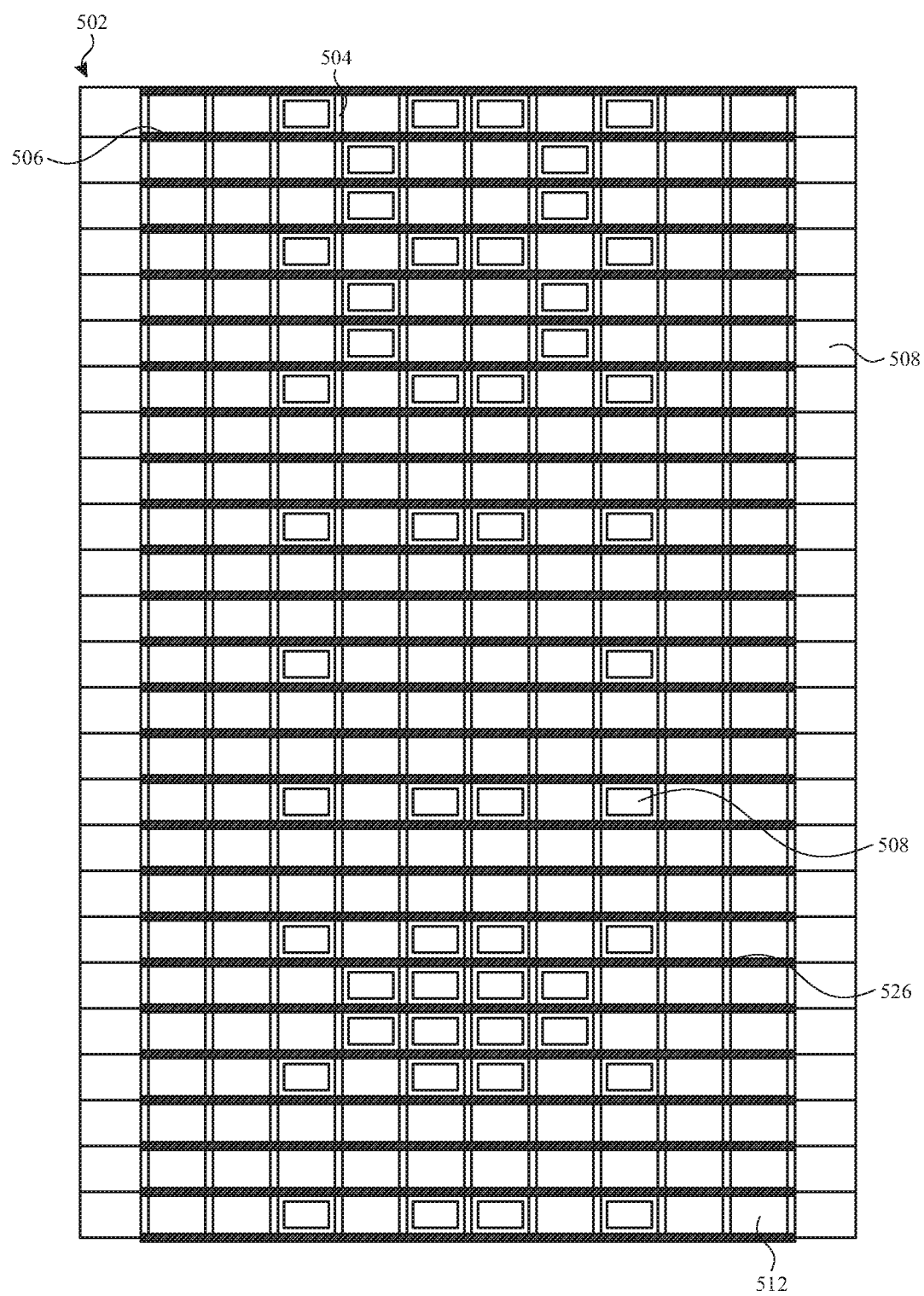

FIGS. 5A-5D illustrate exemplary touch sensor panel configurations that include both mutual capacitance touch electrodes (e.g., row and column electrodes sensed for mutual capacitance) and self-capacitance touch electrodes (e.g., touch node electrodes sensed for self-capacitance) according to examples of the disclosure. Specifically, touch sensor panel 500 of FIG. 5A illustrates a first configuration of mutual capacitance drive electrodes 504 and sense electrodes 506 arranged in a row and column configuration, respectively, and interspersed self-capacitance touch node electrodes 508 according to examples of the disclosure. In some examples, multiple (e.g., two, three, four, etc.) sense electrodes 506 can be electrically connected to each other outside of the area of touch sensor panel 500 shown in FIG. 5A (e.g., on one side, or on both sides of the sense electrodes 506 in a border/inactive region of touch sensor panel 500) to form sense lines that have effectively greater height than the height of a single sense electrode 506. As described above with reference to FIG. 2, the intersection of drive electrodes 504 and sense electrodes 506 can form mutual capacitance touch nodes 526. In some examples, self-capacitance touch node electrodes 508 can be disposed in gaps 512 between drive electrodes 504 and sense electrodes 506 and/or in between mutual capacitance touch nodes 526. In some examples, self-capacitance touch node electrodes 508 can be arranged in every gap 512 or in a subset of gaps 512. For example, self-capacitance touch node electrodes 508 can be arranged in gaps 512 uniformly (e.g., in every other row and/or column, evenly spaced), randomly or pseudo-randomly (e.g., scattered across a subset of gaps 512), and/or interspersed at different densities throughout the touch panel 500 (e.g., self-capacitance touch node electrodes 508 can be arranged with greater concentrations (e.g., number of touch node electrodes per unit area of the touch sensor panel) in some areas (e.g., along the border, in the center, at the top and/or bottom) than other areas of the touch panel 500) (e.g., as illustrated in FIG. 5C). It should be noted that FIG. 5A can reflect the physical layout of drive electrodes 504, sense electrodes 506, and self-capacitance touch node electrodes 508 (e.g., the actual physical placement of the various electrodes in the touch sensor panel stackup), or the logical layout of drive electrodes 504, sense electrodes 506, and self-capacitance touch node electrodes 508 (e.g., the physical placement of the various electrodes in the touch sensor panel stackup can differ from that illustrated, but the illustration can reflect the operational areas of those electrodes).

The routing traces for the electrodes (e.g., the traces that electrically couple the drive electrodes 504, sense electrodes 506 and/or touch node electrodes 508 to drive and/or sensing circuitry such as in FIGS. 3-4) are not shown here for simplicity. Exemplary configurations for such routing traces will be described below with reference to FIGS. 6A-9B. In addition, in some examples, all of the routing traces for electrodes 508 can be directed towards a first side of touch sensor panel 500 (e.g., all of the traces can exit the touch sensor panel on the left side, the right side, the top side or the bottom side of the touch sensor panel, in which case electrically coupled-together sense electrodes 506, if any, can be electrically coupled together in a border region of the touch sensor panel different than the side of the panel at which the traces exit the panel if the routing traces are in the same layer as the sense electrodes 506, for example). In some examples, the routing traces for a first set of electrodes 508 can be directed towards a first side of touch sensor panel 500, and the routing traces for a second set of electrodes 508 can be directed towards a second, different side of the touch sensor panel, such as described with reference to FIGS. 6A-6C and 9B (e.g., the traces for the left-half of electrodes 508 can exit the touch sensor panel on the left side, and the traces for the right-half of electrodes 508 can exit the touch sensor panel on the right side).

The various electrodes of the touch sensor panel may be included on a single layer or may be distributed over multiple layers. In some examples, mutual capacitance drive electrodes 504 and sense electrodes 506, and self-capacitance touch node electrodes 508 can each be included in different layers on the touch sensor panel. For example, the drive electrodes 504 can be disposed in a first material layer on the touch sensor panel, the sense electrodes 506 can be disposed in a second material layer on the touch sensor panel, and the self-capacitance touch node electrodes 508 can be disposed in a third material layer on the touch sensor panel, where the first, second and third material layers can be different material layers. In such examples, self-capacitance touch node electrodes 508 can overlap drive electrodes 504 and/or sense electrodes 506 in the dimension normal to the touch sensor panel, though in some examples, self-capacitance touch node electrodes may not overlap drive electrodes 504 and/or sense electrodes 506 in the dimension normal to the touch sensor panel. In some examples, mutual capacitance drive electrodes 504 and sense electrodes 506, and self-capacitance touch node electrodes 508 can all be arranged on the same layer on the touch sensor panel (e.g., using bridges and vias), which can reduce the thickness of touch sensor panel 500. In some examples, mutual capacitance drive electrodes 504 or sense electrodes 506 can be on different layers and self-capacitance touch node electrodes 508 can be on the same layer as either mutual capacitance drive electrodes 504 or sense electrodes 506, as described below. In such examples where self-capacitance touch node electrodes 508 are positioned between two adjacent electrodes (e.g., between adjacent drive electrodes in the same layer as the drive electrodes, or between adjacent sense electrodes in the same layer as the sense electrodes), the touch sensor panel can also include dummy electrodes between those adjacent electrodes at different positions between those adjacent electrodes. In some examples, the dummy electrodes can have the same size/pitch/aspect ratio as the self-capacitance touch node electrodes 508, or may have different size/pitch/aspect ratio than the self-capacitance touch node electrodes 508 (e.g., there may be multiple dummy electrodes in the same space that would be taken up by a self-capacitance touch node electrode 508). In some examples, these dummy electrodes may not be sensed for touch (whether self-capacitance or mutual capacitance).

It should be noted that self-capacitance touch node electrodes 508 can be arranged adjacent to mutual capacitance drive electrodes 504 and/or sense electrodes 506 (e.g., in any gaps next to and/or between mutual capacitance drive electrodes 504 and/or sense electrodes 506), and/or be arranged within mutual capacitance drive electrodes 504 and/or within sense electrodes 506 on the same layer (e.g., within hollowed out portions or gaps within mutual capacitance drive electrodes 504 and/or sense electrodes 506). It should also be noted that self-capacitance touch node electrodes 508 can vary in size and shape (e.g., can be squares, rectangles, diamonds, circles, or any other polynomial shape), and can be dispersed uniformly or sporadically on touch sensor panel 500 (e.g., self-capacitance touch node electrodes 508 can be, but need not be, separated by equal distance from other self-capacitance touch node electrodes 508). In some examples, self-capacitance touch node electrodes 508 can be arranged in clusters/higher density regions of touch node electrodes 508 (e.g., in uniform or varying groups of 2-4 electrodes) and such clusters can be interspersed (e.g., uniformly or sporadically) throughout touch sensor panel 500. In some examples, self-capacitance touch node electrodes 508 can have a dimension along a given axis that is equal to or less than one half (or one third, or one fourth) of the dimension of a dimension of drive electrodes 504 and/or sense electrodes 506 along that given axis. For example, if a given drive electrode 504 on touch sensor panel 500 has a width of X, the widths of touch node electrodes 508 can be equal to or less than X/2, X/3, X/4, or less. Additionally or alternatively, if a given sense electrode 506 has a height of Y, the height of touch node electrodes 508 can be equal to or less than Y/2, Y/3, Y/4, or less. Additional exemplary details of arrangements of touch node electrodes and drive/sense electrodes in accordance with the examples of the disclosure will be described below, including with reference to FIGS. 10A-10D of the disclosure.

In some examples, the touch sensor panel of the disclosure can include a border region comprising self-capacitance touch node electrodes that can help with sensing the gripping of the device including the touch sensor panel by a user and/or objects hovering over the edges of the touch sensor panel. FIG. 5B illustrates a second configuration of mutual capacitance drive electrodes 504 and sense electrodes 506 arranged in a row and column configuration and self-capacitance touch node electrodes 508 arranged along the border of, and interspersed in a subset of gaps 512 (or more generally, positions within the area of the touch sensor panel that includes drive and sense electrodes, and not necessarily gaps between drive and sense electrodes), within touch sensor panel 501 according to examples of the disclosure. The self-capacitance touch node electrodes 508 disposed within the interior of touch sensor panel 501 of FIG. 5B can have one or more of the characteristics described with reference to FIG. 5A. Arranging self-capacitance touch node electrodes 508 along the border or surrounding region of touch sensor panel 501 (e.g., the region surrounding the region of the touch sensor panel that contains the drive and sense electrodes) can help detect when a device with touch sensor panel 501 is being gripped or held by a user (e.g., in contact with the user), because a user's grip of the device in which touch sensor panel 501 is included will likely be along the edge of touch sensor panel 501. This arrangement can also help detect objects (e.g., a finger) hovering around the device (e.g., close to the edge of touch sensor panel 501). In some examples, the self-capacitance touch node electrodes 508 arranged on the border or surrounding region of touch sensor panel 501 can be the same size and/or shape as the self-capacitance touch node electrodes 508 interspersed within touch sensor panel 501. In some examples, self-capacitance touch node electrodes 508 can vary in size and/or shape (e.g., can be squares, rectangles, diamonds, circles, or any other polynomial shape) throughout the touch sensor panel 501, as described in this disclosure. In some examples, self-capacitance touch node electrodes 508 arranged along the border or surrounding region can be on the same layer and/or on a different layer as the self-capacitance touch node electrodes 508 interspersed throughout touch sensor panel 501. In some examples, the border or surrounding region of touch sensor panel 501 can be comprised of multiple self-capacitance touch node electrodes 508 at each side of touch sensor panel 501 along the X and Y axes (e.g., making the width of the self-capacitance touch node electrode border of touch sensor panel 501 two or more self-capacitance touch node electrodes 508 wide), thus increasing the area of the border of self-capacitance node touch electrodes 508 on touch sensor panel. In some examples, the border or surrounding region of self-capacitance touch node electrodes 508 on touch sensor panel 501 can include gaps of self-capacitance touch node electrodes 508 (e.g., self-capacitance touch node electrodes 508 can form a border around touch sensor panel 501 without each self-capacitance touch node electrode being immediately adjacent to other self-capacitance touch node electrodes). For example, touch node electrodes 508 in the surrounding region of the touch sensor panel can be spaced apart from each other by a gap that is at least half the height/width of the touch node electrodes, at least the entire height/width of the touch node electrode, at least 1.5 times the height/width of the touch node electrode, etc. In some examples, the touch node electrodes 508 in the surrounding region of the touch sensor panel can be spaced such that portions of mutual capacitance touch electrodes (e.g., row and/or column electrodes) can be positions between two adjacent touch node electrodes 508.

FIG. 5C illustrates a third configuration of mutual capacitance drive electrodes 504 and sense electrodes 506 arranged in a row and column configuration and self-capacitance touch node electrodes 508 arranged along the sides of, and interspersed in a subset of gaps or positions 512 within, touch sensor panel 502 according to examples of the disclosure. The self-capacitance touch node electrodes 508 disposed within the interior of touch sensor panel 502 of FIG. 5C can have one or more of the characteristics described with reference to FIGS. 5A-5B. Arranging self-capacitance touch node electrodes 508 on the sides of touch sensor panel 502 can help detect when a device with touch sensor panel 502 is being gripped by a user (e.g., is in contact with the user), because a user's grip of the device in which touch sensor panel 502 is included will likely be along the edge of touch sensor panel 502. This arrangement can also help detect objects (e.g., a finger) hovering around the device (e.g., close to the edge of touch sensor panel 502). In some examples, the self-capacitance touch node electrodes 508 arranged along the sides of touch sensor panel 502 can be the same size and/or shape as the self-capacitance touch node electrodes 508 interspersed within touch sensor panel 502. In some examples, self-capacitance touch node electrodes 508 can vary in size and/or shape (e.g., can be squares, rectangles, diamonds, circles, or any other polynomial shape) throughout the touch sensor panel 502, as described in this disclosure. In some examples, self-capacitance touch node electrodes 508 arranged on the sides of touch sensor panel 502 can be on the same layer and/or on a different layer as the self-capacitance touch node electrodes 508 interspersed throughout touch sensor panel 502. In some examples, the sides of touch sensor panel 502 can be comprised of multiple rows of self-capacitance touch node electrodes 508 at each side (e.g., making the width of the self-capacitance touch node electrode sides of touch sensor panel 502 two or more self-capacitance touch node electrodes 508 wide), thus increasing the area of the self-capacitance touch node electrodes 508 at the sides of the touch sensor panel. In some examples, self-capacitance touch node electrodes 508 can be arranged on one or more sides of touch sensor panel 502 (e.g., top, bottom, left, and/or right).

Figure 5D:
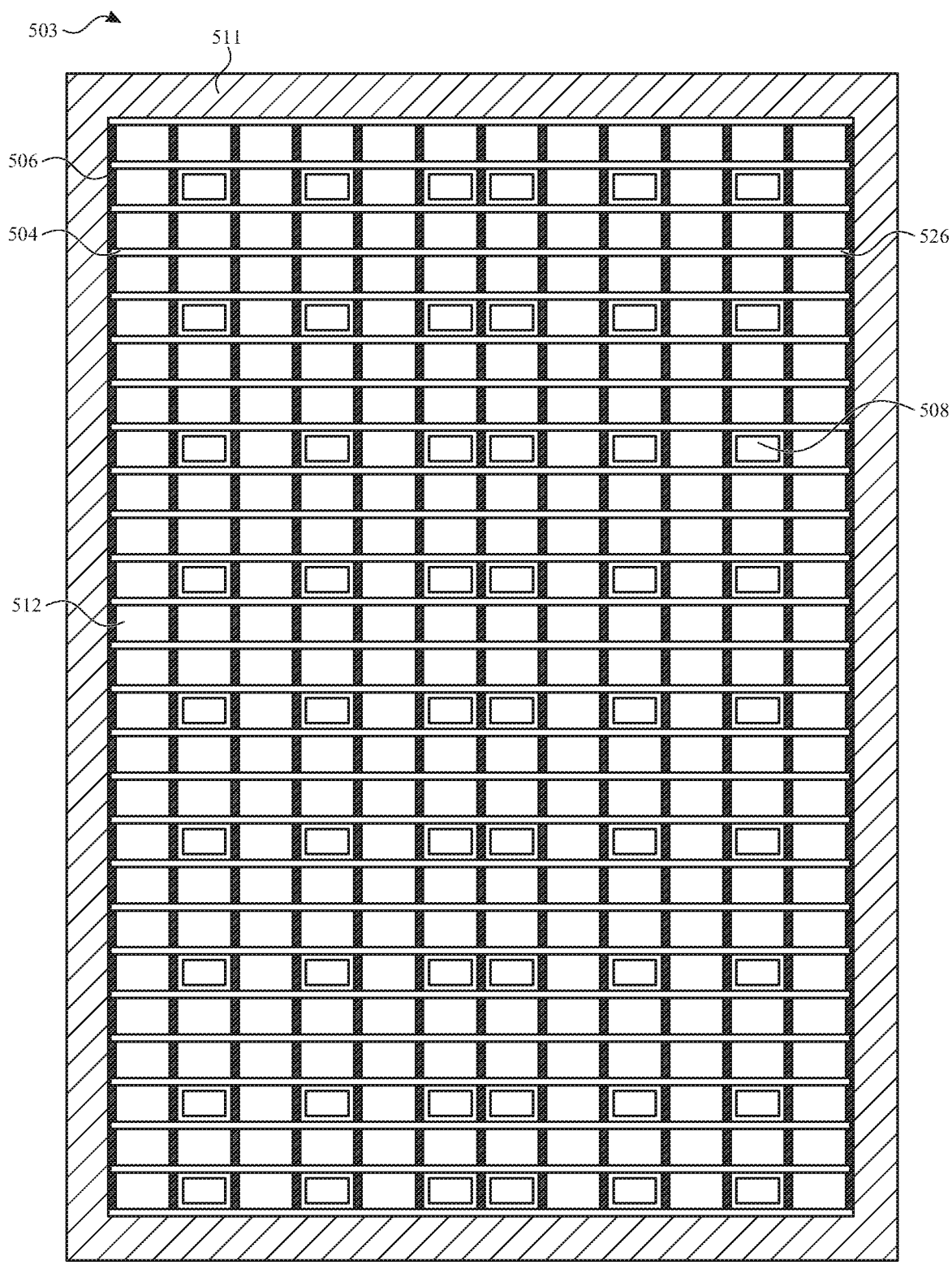

In some examples, any of the touch sensor panels described herein, including those described with reference to FIGS. 5A-5C and 10A-10E, can include a guard layer that can be a conductive sheet in a layer of the touch sensor panel different than the row/column and touch node electrodes of the touch sensor panel (e.g., in a layer of the touch sensor panel below the layers that include the row/column and touch node electrodes), and which can be used to facilitate touch sensing on the touch sensor panel by being coupled to a guard signal. For example, FIG. 5D illustrates a touch electrode configuration that includes guard layer 511 according to examples of the disclosure. Specifically, touch electrode configuration 503 shows guard layer 511 disposed on a first metal layer, column touch electrodes 506 arranged in a vertical or column configuration disposed on a second layer (e.g., above the first layer), row touch electrodes 504 arranged in a horizontal or row configuration on a third layer (e.g., above the second layer), and touch electrodes 508 interspersed throughout the touch sensor panel 503 on the first layer, the second layer, the third layer and/or a fourth layer (e.g., above the third layer) (e.g., as described above with reference to FIGS. 5A-5C). As described herein, touch electrodes 504, 506, and 508 can be configured to operate in a mutual touch sensing mode or a self-capacitance touch sensing mode at different points in time. For example, at one point in time, touch electrodes 504 can be operated as drive electrodes and touch electrodes 506 can be operated as sense electrodes (and vice versa) for mutual capacitance touch sensing (e.g., as described above with reference to FIG. 4), and/or touch electrodes 508 can be operated as self-capacitance electrodes for self-capacitance touch sensing (e.g., as described above with reference to FIG. 3). At another point in time, touch electrodes 506 can be operated as drive electrodes and touch electrodes 504 can be operated as sense electrodes (and vice versa) for mutual capacitance touch sensing (e.g., as described above with reference to FIG. 4), and/or touch electrodes 508 can be operated as self-capacitance electrodes for self-capacitance touch sensing (e.g., as described above with reference to FIG. 3). In some examples, guard electrode 511 can comprise a sheet of conductive material that can span the entire area of touch sensor panel 503 (e.g., a continuous layer of conductive material in the first layer below touch electrodes 504, 506, and 508 and potentially above display circuitry that is below the touch sensor panel 503). In some examples, guard electrode 511 can be operated as a guard (e.g., can be actively driven at a reference voltage (e.g., AC or DC) or can be coupled to ground or any other fixed voltage source) to reduce noise coupled to touch electrodes 504, 506, and 508 (e.g., false positives or parasitic coupling) during touch sensing. It should be understood that guard electrode 511 can be included in any of the touch sensor panels described in this disclosure.

Thus, as described herein, the touch electrodes can be distributed across multiple layers of the touch sensor panel in various ways. In some examples, the sense electrodes can be located in a first metal layer on the touch sensor panel, the touch node electrodes and the drive electrodes can be located in a second metal layer on the touch sensor panel (e.g., below the first metal layer in the touch sensor panel stackup), and the guard layer can be included in a third metal layer on the touch sensor panel (e.g., below the second metal layer in the touch sensor panel stackup). In some examples, this distribution of electrodes can also include a top shield layer in the first metal layer along with openings (e.g., for self-capacitance electrodes in a border/surrounding region of the touch sensor panel) and dummy traces in a border/surrounding region of the touch sensor panel, as described with reference to FIGS. 8B-8C.

In some examples, the drive and sense electrodes can be located in a first metal layer on the touch sensor panel, and the self-capacitance touch node electrodes can also be located in the first metal layer. In such examples, ITO bridges in a separate metal layer can be used to electrically couple segments of drive electrodes over sense electrodes (or vice versa). In some examples, this distribution of electrodes can include the guard layer in a second metal layer of the touch sensor panel (e.g., below the first metal layer in the touch sensor panel stackup).

In some examples, the sense electrodes and the self-capacitance touch node electrodes can be located in a first metal layer on the touch sensor panel, and the drive electrodes can be located in a second metal layer on the touch sensor panel (e.g., below the first metal layer in the touch sensor panel stackup).

In some examples, the sense electrodes can be located in a first metal layer on the touch sensor panel, and the self-capacitance touch node electrodes and the drive electrodes can be located in a second metal layer on the touch sensor panel (e.g., below the first metal layer in the touch sensor panel stackup).

Figure 6A:
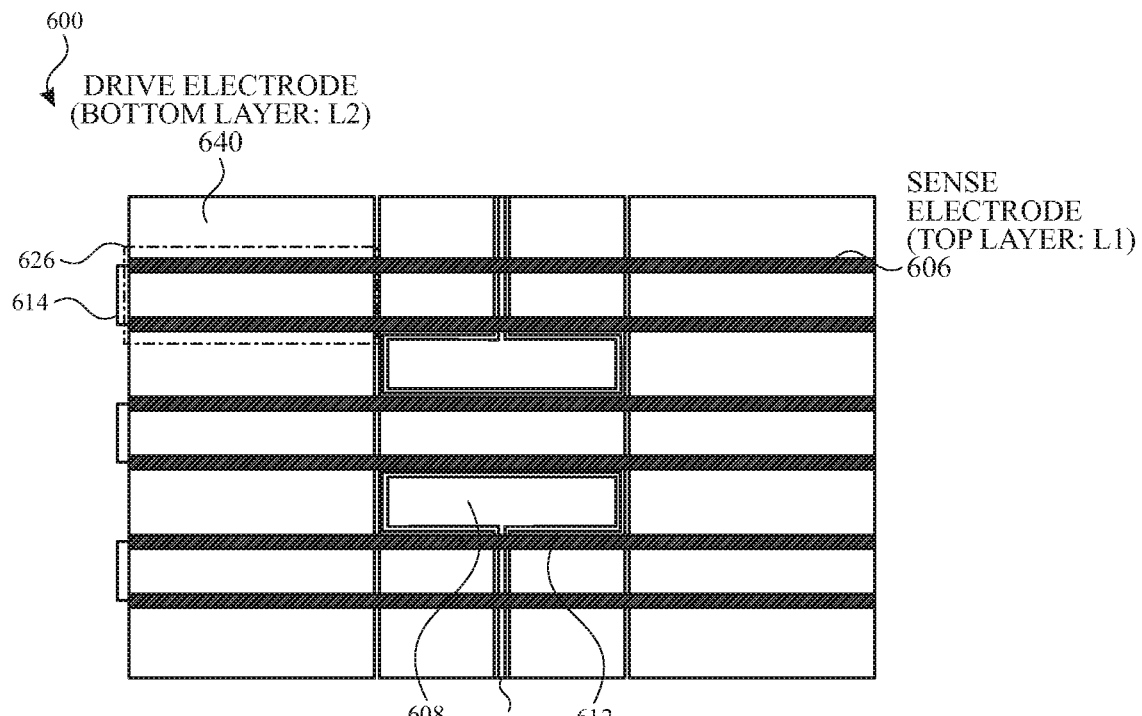
FIGS. 6A-6C illustrate exemplary touch sensor panel configurations in which touch node electrodes are arranged in the same layer as drive electrodes according to examples of the disclosure.
Figure 6B:
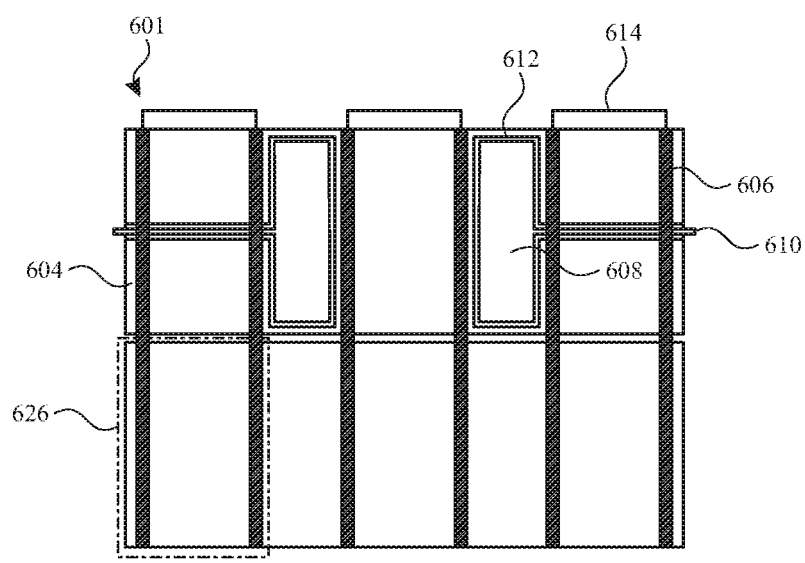
Figure 6C:
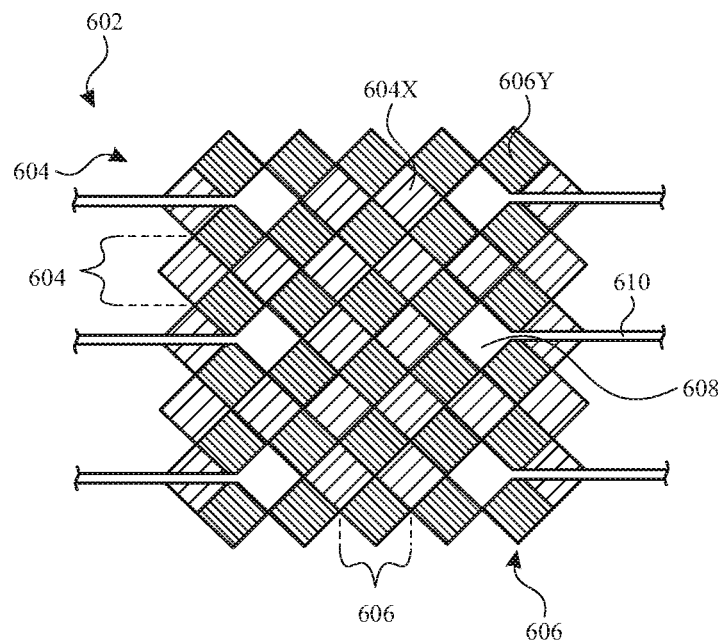

FIGS. 6A-6C illustrate exemplary touch sensor panel layouts in which touch node electrodes are arranged in the same layer as column electrodes (e.g., drive electrodes) according to examples of the disclosure. The details of FIGS. 6A-6C can be used to implement the touch sensor panel configurations of FIGS. 5A-5D, for example. Specifically, FIG. 6A illustrates an exemplary touch sensor panel layout 600 in which column electrodes 604 and row electrodes 606 are arranged in a column and row configuration, respectively, on two different layers of the touch sensor panel (e.g., the drive electrodes are disposed on a first layer and the sense electrodes are disposed on a second layer) to form mutual capacitance touch nodes 626 (symbolically illustrated by broken electrodes). In the example of FIG. 6A, touch node electrodes 608 are on the same layer as drive electrodes 604 (e.g., the first layer), and drive electrodes 604 are disposed below sense electrodes 606 on the touch sensor panel (e.g., sense electrodes 606 are disposed closer to the touch surface of the touch sensor panel, and drive electrodes 604 are disposed further from the touch surface of the touch sensor panel). In the exemplary touch sensor panel layout 600, electrodes 608 can be arranged in electrically isolated regions of drive electrodes 604. For example, drive electrodes 604 can include areas 612 (e.g., voids) that do not include conductive material. Touch node electrodes 608 can be disposed in these voids, in the same layer as drive electrodes 604. Voids 612 can have areas larger than electrodes 608, such that the electrodes 608 can be disposed in those voids without making contact with drive electrodes 604. In some examples, routing traces 610 for electrodes 608 (e.g., traces for coupling the touch node electrodes 608 to sensing circuitry) can be disposed on the same layer as drive electrodes 604 (e.g., routed along and within gaps, hollowed out portions, or other electronically isolated regions of drive electrodes 604) as illustrated in FIG. 6A. In the example of FIG. 6A, these traces 610 can be routed along the lengths of the drive electrodes 604, such that the traces 610 do not cross over into other drive electrodes 604. In some examples, routing traces 610 for electrodes 608 can be disposed on a different layer as drive electrodes 604 and electrodes 608 (e.g., in a third layer). In some examples, sense electrodes 614 can be coupled in groups of two (or more) by traces 614 to act as a single sense electrode, as illustrated in FIG. 6A.

FIG. 6B illustrates an exemplary touch sensor panel layout 601 that is similar to the touch sensor panel layout 600 of FIG. 6A, but with drive electrodes 604 and sense electrodes 606 arranged in a row and column configuration, respectively, rather than a column and row configuration, respectively. The remaining details of FIG. 6B can be the same as those of FIG. 6A. In a touch sensor panel that is narrower along the X axis than along the Y axis, this configuration can shorten routing traces 610 along the X axis (e.g., because of the narrowness of the touch sensor panel along the X axis), reduce resistance along routing traces 610 (e.g., due to the shorter routing traces), and/or reduce the effects of noise coupled to the routing traces 610 (e.g., due to the shorter routing traces). In some examples, the routing traces for electrodes 608 in FIGS. 6A-6B can have different widths as a function of the positions of the electrodes 608 in the touch sensor panel to optimize their bandwidths. Further, in some examples, the routing trace position within a drive electrode in FIGS. 6A-6B could be anywhere in the drive electrode (e.g., not necessarily in the middle of the drive electrode) to minimize cross-coupling between the electrode 608 routing traces and drive and/or sense electrodes.

FIG. 6C illustrates an exemplary touch sensor panel layout 602 in which sense electrodes 606 and drive electrodes 604 are formed by rows and columns of individual diamond-shaped touch electrodes 606y and 604x that are coupled together using appropriate structures such as ITO bridges, according to examples of the disclosure. For example, a row of touch electrodes 604x can be electrically coupled together and driven by a signal (e.g., AC signal) to form a drive electrode 604 (or "drive line"), and a column of touch electrodes 606y can be electrically coupled together and sensed to form a sense electrode 606 (or "sense line"). In some examples, electrodes 608 can be arranged in place of one or more touch electrodes 604x that form a drive electrode 604, as illustrated in FIG. 6C. A row of touch electrodes can include touch electrodes 604x (e.g., electrodes that are dedicated drive electrode electrodes) and touch node electrodes 608 (e.g., electrodes that are used for self-capacitance touch detection, and potentially used for mutual capacitance detection, as will be described in more detail below).

In some examples, touch electrodes 604x, 606y and 608 can be on the same layer or on three different layers. For example, touch electrodes 604x can be on a first layer, touch electrodes 606y can be on a second layer, different than the first layer, and touch electrodes 608 can be on a third layer, different than the first and second layers. In some examples, touch electrodes 604x and 606y can be on different layers (e.g., on a first and second layer, respectively) and electrodes 608 can be on the same layer as touch electrodes 604x and/or 606y. In some examples, routing traces 610 can be coupled to touch node electrodes 608 and be routed to touch sensing circuitry. In some examples, routing traces 610 can be on the same layer as, but electrically isolated from, touch electrodes 606y. In some examples, routing traces 610 can be on the same layer as, but electrically isolated from, touch electrodes 604x. In some examples, routing traces 610 can be on a different layer than touch electrodes 604x and 606y. In some examples, routing traces 610 can be on the same layer as touch electrodes 608 and can be electrically isolated from touch electrodes 604x and 606y (e.g., touch electrodes 604x and 606y can be on different layers from touch electrodes 608 and routing traces 610).

The individual diamond-shaped touch electrodes of exemplary touch sensor panel layout 602 of FIG. 6 can all be substantially the same size. In this way, the capacitance detected at each touch electrode can be the same—thus, improving touch-sensing. For example, the detected capacitance between an object (e.g., a finger) at a given distance from the touch sensor panel and one of the touch electrodes can be the same for each touch electrode the finger hovers over at the same given distance (e.g. the touch sensor panel can detect consistent capacitance measurements across each touch electrode at a given distance). This configuration can also improve optical uniformity because of how closely together the touch electrodes can be arranged.

Operation of the touch sensor panels of FIGS. 6A-6C will now be described. The details of such operation can similarly apply to the touch sensor panels of FIGS. 5A-5D, as well as the touch sensor panels of FIGS. 7-10. In some examples, the exemplary touch sensor panels of FIGS. 6A-6C can operate in a self-capacitance mode and in a mutual capacitance mode. For example, in the self-capacitance mode, touch sensing circuitry can detect a touch and/or a hovering object by detecting changes in the self-capacitance of electrodes 608, as described above with reference to FIG. 3, while electrodes 604 and 606 can act as guard electrodes (e.g., can be actively driven at a reference voltage (e.g., AC or DC) or can be coupled to ground or any other fixed voltage source) to reduce noise detected at self-capacitance electrodes 608 (e.g., false positives or parasitic coupling), to reduce cross-coupling from grounded objects (e.g., fingers or a grip of the device including the touch sensor panel), and/or reduce capacitance leakage (e.g., from display circuitry below the touch sensor panel). In some examples, touch sensing circuitry can also detect the self-capacitances of electrodes 604 and/or 606—in addition to self-capacitance electrodes 608—to detect a touch and/or a hovering object by detecting changes in the self-capacitances of electrodes 604 and/or 606 (e.g., electrodes 604 and 606 can both be operated as self-capacitance electrodes; electrodes 604 can be operated as self-capacitance electrodes and electrodes 606 can be operated as guard electrodes, or vice versa). Thus, in the self-capacitance detection mode, the self-capacitances of only electrodes 608, or the self-capacitances of electrodes 604, 606 and/or 608, can be detected by touch sensing circuitry.

In the mutual capacitance mode, touch node electrodes 608 can be driven by the same signal (e.g., AC signal) as mutual capacitance drive electrodes 604, such that electrodes 608 and the drive electrode in which they are disposed can behave as a single drive electrode (e.g., electrodes 608 can help form drive electrodes 604), while sense electrodes 606 can be sensed by touch sensing circuitry. In some examples, electrodes 608 can be coupled to ground or be driven by another reference voltage (e.g., DC or AC) during the mutual capacitance mode while drive electrodes 604 are being driven by a stimulation voltage and sense electrodes 606 are being sensed by touch sensing circuitry. In some examples, electrodes 608 can be grouped (e.g., in adjacent pairs of self capacitance electrodes) to operate as mutual capacitance electrodes. For example, pairs of electrodes 608 can be driven such that a touch electrode in each pair can act as a sense electrode and a second touch electrode in each pair can act as a drive electrode, such that mutual capacitance touch nodes can be formed by the each pair of touch electrodes acting as sense and drive electrodes. In another example, groups of electrodes 608 in a first direction (e.g., groups of electrodes along the same rows) can act as drive electrodes and other groups of electrodes 608 in a second direction, different than the first direction (e.g., groups of electrodes along the same columns) can act as sense electrodes, such that mutual capacitance touch nodes can be formed by the groups of electrodes acting as drive and sense electrodes. In some examples, touch sensing circuitry can be configured to detect changes in the mutual capacitance between the pairs or groups of electrodes acting as drive and sense electrodes in a row and column configuration (e.g., detected changes in the capacitance of the mutual capacitance touch nodes formed by the groups of self-capacitance electrodes), as described above with references to FIGS. 1-2. In some examples, touch sensing circuitry can be configured to perform mutual capacitance sensing during a first phase (e.g., the mutual capacitance mode) and self-capacitance sensing during a second phase (e.g., the self-capacitance mode), where the first and second phases do not overlap in time, though in other examples, the first and second phases can partially or fully overlap in time. In some examples, the durations of the first phase and the second phase can be fixed (e.g., be predetermined). In some examples, the durations of the first phase and the second phase can be dynamic.

In some examples, self-capacitance measurement of touch electrodes 608 can clarify touch or proximity event ambiguities resulting from detecting touch or proximity events using the row and column electrodes in a self-capacitance detection configuration. For example, a touch or proximity event can be detected using self-capacitance along any point of a given row electrode, but there may be an ambiguity as to the exact location of the touch or proximity event on the row electrode—especially when multiple touch or proximity events (e.g., multi-finger touches and/or multi-finger hovering) are detected—which can create "ghost" touch or proximity events along row or column electrodes. Utilizing self-capacitance measurements from the touch node electrodes in conjunction with self-capacitance measurements from the row/column electrodes (e.g., simultaneously, serially, or partially serially) can help clarify the location of the actual touch or proximity event(s) by detecting a touch or proximity event at nearby touch node electrode(s) (e.g., touch node electrode(s) in close proximity to the physical touch(es) or hovering object(s)). For example, the touch sensor panel can detect multiple touch or proximity events along a given row electrode (e.g., at the location of one or more touches or proximity events and one or more ghost events) using self-capacitance measurement, and the touch sensor panel can, subsequently or concurrently, detect a location of one or more touches or proximity events using self-capacitance measurement of the touch node electrodes to validate the true location of the one or more touches or proximity events along the given row electrode (e.g., to differentiate between the actual touches or proximity events and the ghost events). Thus, the touch sensing performance of the touch sensor panel can be improved.

Figure 7A:
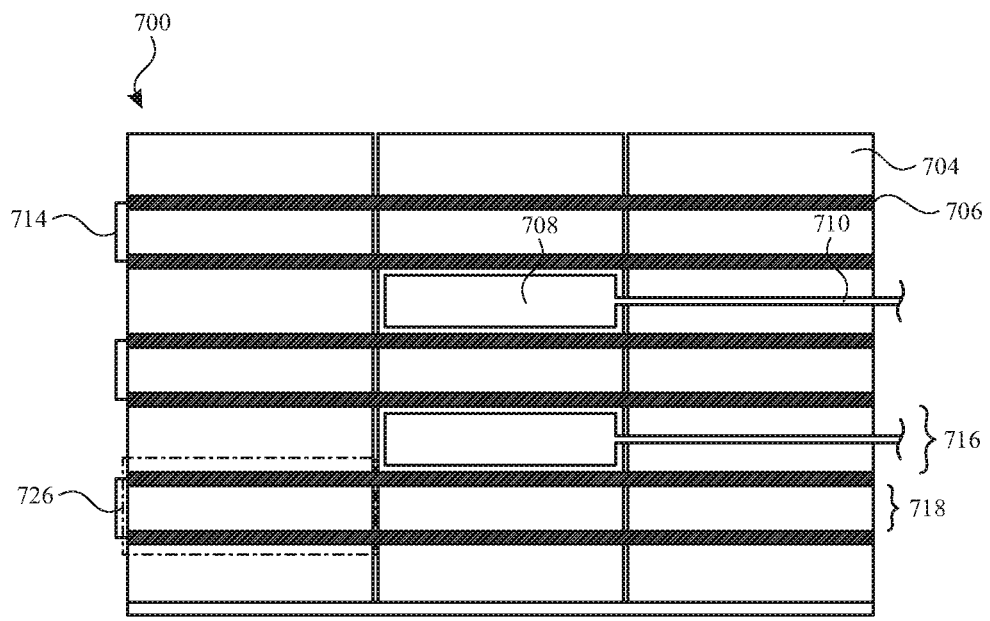
FIGS. 7A-7B illustrate exemplary touch sensor panel configurations in which touch node electrodes are arranged in the same layer as sense electrodes according to examples of the disclosure.
Figure 7B:
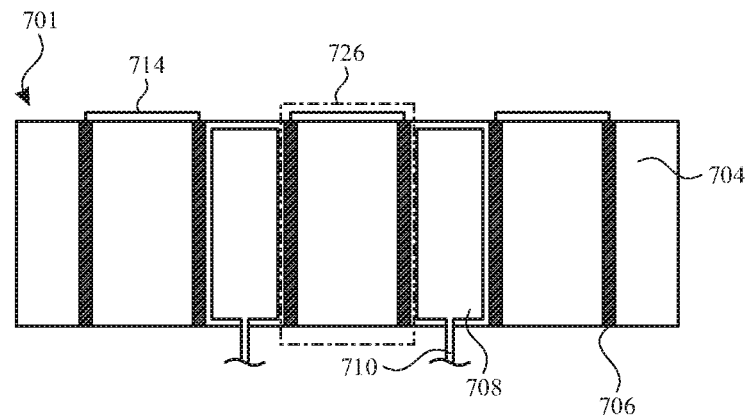

FIGS. 7A-7B illustrate exemplary touch sensor panel layouts in which touch node electrodes 708 are disposed in the same layer as sense electrodes 706 according to examples of the disclosure. The details of FIGS. 7A-7B can be used to implement the touch sensor panel configurations of FIGS. 5A-5D, for example. Specifically, FIG. 7A illustrates an exemplary touch sensor panel layout 700 in which column electrodes 704 (e.g., drive electrodes) and row electrodes 706 (e.g., sense electrodes) are arranged in a column and row configuration, respectively, on two different layers of the touch sensor panel (e.g., the drive electrodes are disposed on a first layer and the sense electrodes are disposed on a second layer) to form mutual capacitance touch nodes 726 (symbolically illustrated by broken electrodes). In some examples of FIG. 7A, touch node electrodes 708 are on the same layer as sense electrodes 706 (e.g., the second layer), and sense electrodes 706 are disposed above drive electrodes 704 on the touch sensor panel (e.g., sense electrodes 706 are disposed closer to the touch surface of the touch sensor panel, and drive electrodes 704 are disposed further from the touch surface of the touch sensor panel). In the exemplary touch sensor panel layout 700, electrodes 708 can be disposed adjacent to sense electrodes 706 (e.g., between sense electrodes 706) and disposed on the same layer as the sense electrodes 706. In some examples, electrodes 708 can be disposed between pairs of coupled sense electrodes 706 in regions 716, as illustrated in FIG. 7A. In some examples, electrodes 708 can be disposed within pairs of coupled sense electrodes 706 in regions 718. In some examples, electrodes 708 can be contained within the area of a single electrode 704 (e.g., can overlap with only one electrode 704, as in FIG. 7A), or can overlap multiple electrodes 704 (e.g., can straddle one or more boundaries between electrodes 704). In this configuration in which touch node electrodes 708 are disposed within pairs of coupled sense electrodes 706, electrodes 708 can be sensed by touch sensing circuitry in the same manner as the sense electrodes 706 in which they are disposed during a mutual capacitance mode of the touch sensor panel such that electrodes 708 can act as sense electrodes during the mutual capacitance mode (e.g., the electrodes 708 and the coupled sense electrodes 706 within which they are disposed can act as a single sense electrode). In some examples, routing traces 710 for electrodes 708 can be disposed on the same layer and along the same direction as sense electrodes 706. In some examples, routing traces 710 for electrodes 708 can be arranged on a different layer than sense electrodes 706.

FIG. 7B illustrates the exemplary touch sensor panel layout 701 of FIG. 7A but with drive electrodes 704 and sense electrodes 706 arranged in a row and column configuration, respectively. The remaining details of the touch sensor panel layout 701 of FIG. 7B can be the same as those described with reference to FIG. 7A.

In the examples described with reference to FIGS. 7A-7B, empty areas between sense electrodes and/or touch node electrodes and corresponding routing traces (e.g., empty areas in the material layer in which the sense electrodes and the touch node electrodes and corresponding routing traces are located) can include dummy electrodes of various sizes to improve optical uniformity of the touch sensor panel. In some examples, these dummy electrodes can be in the same material layer in which the sense electrodes and the touch node electrodes and corresponding routing traces are located.

Figure 8A:
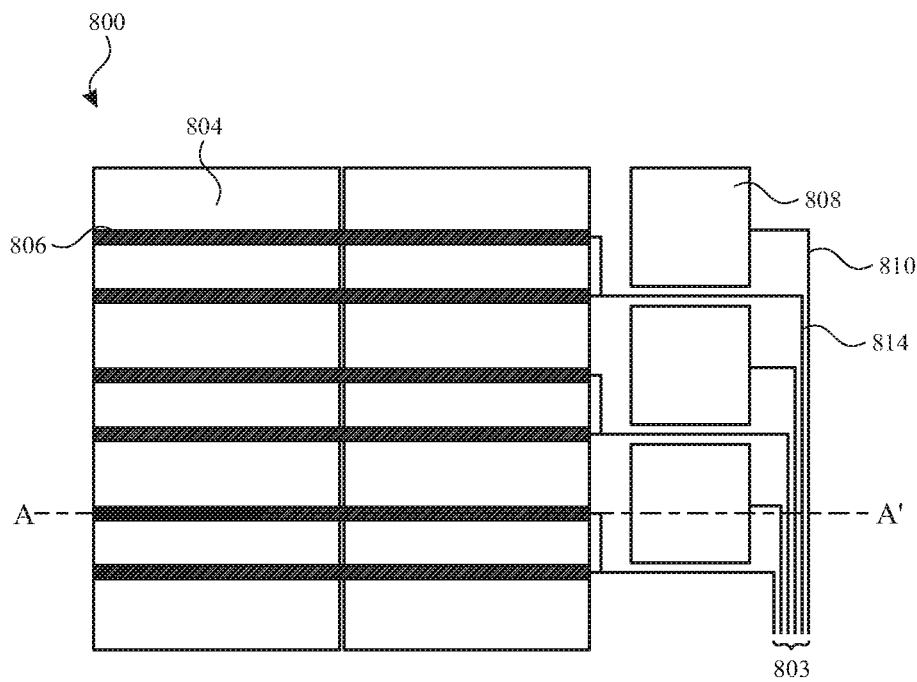
FIGS. 8A-8C illustrate exemplary touch sensor panel configurations of drive/sense electrodes and touch node electrodes and their routing traces according to examples of the disclosure.
Figure 8B:
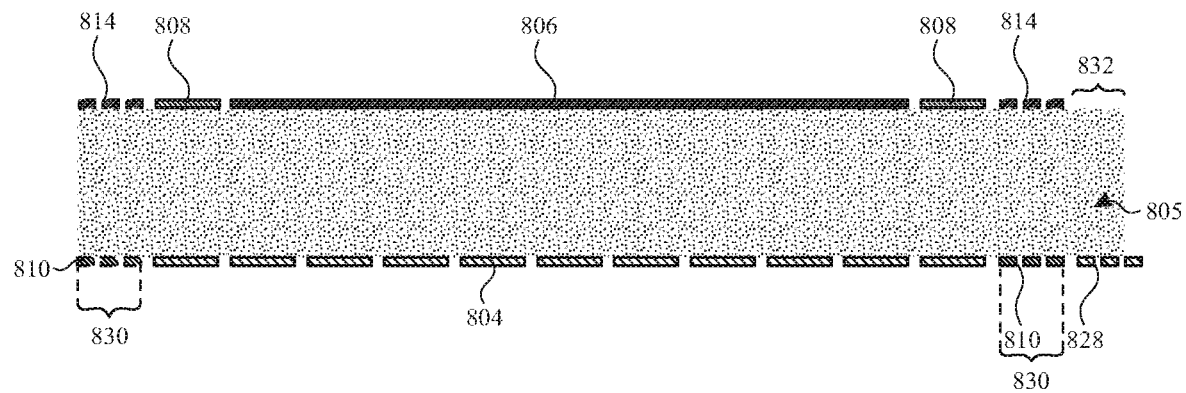
Figure 8C:
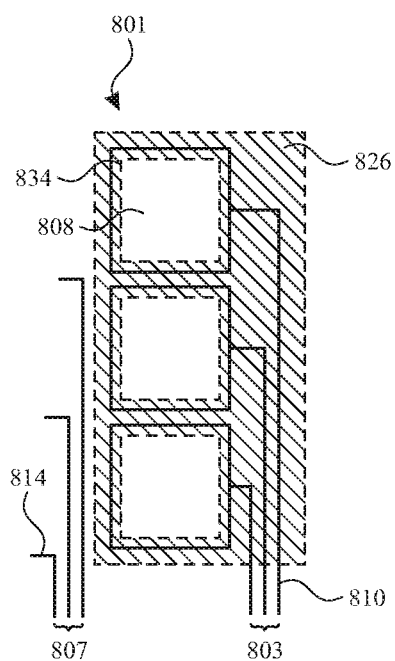

FIGS. 8A-8C illustrate exemplary layer and routing details of the touch sensor panel configurations of this disclosure (e.g., the touch sensor panel configurations of FIGS. 5A-5D, 6A-6C, 7A-7C and/or 10A-10E) according to examples of the disclosure. Specifically, FIG. 8A illustrates an exemplary touch sensor panel layout 800 of the right-side portion of a touch sensor panel with sense electrodes 806 and drive electrodes 804 arranged in a row and column configuration, respectively, and electrodes 808 disposed along the right-side border of the touch sensor panel (e.g., as described with reference to FIGS. 5B-5C). Although not shown, electrodes 808 can be interspersed throughout the touch sensor panel 800 and along the top, bottom, and/or left-side border of the touch sensor panel, as described above with reference to FIGS. 5A-5D. As described above with reference to FIG. 6A, routing traces 814 can couple two adjacent sense electrodes 806 to act as a single sense electrode. In some examples, routing traces 814 can be routed out to touch sensing circuitry in between border-disposed electrodes 808 (and their corresponding routing traces 810) to the outer side(s)/region 803 of the touch sensor panel, as illustrated in FIG. 8A. Thus, in some examples, routing traces for sense electrodes 806 (e.g., traces 814) and routing traces for border region touch node electrodes 808 (e.g., traces 810) can be routed together in border region 803, which can be located between touch node electrodes 808 and a physical edge of the touch sensor panel—in some examples, traces 810 and 814 can be alternately arranged in this border region 803 (e.g., sense electrode trace, touch node electrode trace, sense electrode trace, touch node electrode trace, etc.). In some examples, electrodes 808 and sense electrodes 806 can be disposed on the same layer (e.g., a first layer) and drive electrodes 804 can be disposed on a different layer (e.g., a second layer, different than the first layer). In some examples, routing traces 814 for sense electrodes 806 and routing traces 810 for electrodes 808 can be disposed on the same layer. In some examples, routing traces 814 for sense electrodes 806 and routing traces 810 for electrodes 808 can be disposed on different layers (e.g., routing traces 810 disposed on a first layer and routing traces 814 disposed on a second layer, different than the first layer).

FIG. 8B illustrates a cross-section of the exemplary touch sensor panel configuration 800 of FIG. 8A along line A-A'. In this configuration, drive electrodes 804 can be arranged (e.g., disposed) on a first side (e.g., a bottom side) of substrate 805 (e.g., glass, plastic, etc.) in a first layer, and sense electrodes 806 and electrodes 808 can be arranged (e.g., disposed) on a second side of substrate 805 (e.g., the opposite or top side) in a second layer, different than the first layer. In some examples, drive electrodes 804 and their corresponding routing traces 828 can both be arranged (e.g., disposed) on a first side of substrate 805 (e.g., the first layer) and sense electrodes 806, and their corresponding routing traces 814, can be arranged (e.g., disposed) on a second side (e.g., the opposite side) of substrate 805 (e.g., a second layer, different than the first layer). In some examples, routing traces 814 and 828 can be arranged such that they do not directly overlap (e.g., such that routing traces 814 are not immediately above or below routing traces 828) to avoid parasitic coupling between the two sets of routing traces. Because routing traces 814 and 828 can be arranged such that they do not directly overlap, gaps 830 can be formed below and/or above routing traces 814 on the first side of substrate 805 (e.g., in the first layer) and gaps 832 can be formed above and/or below routing traces 828 on the second side (e.g., the opposite side) of substrate 805 (e.g., the second layer). In some examples, routing traces 810 for self-capacitance electrodes 808 can be routed along gaps 830 of the first side of substrate 805 (e.g., the same side of substrate 805 as drive electrodes 804 and their corresponding routing traces 828) (e.g., the first layer) and/or gaps 832 of the second side, not shown in FIG. 8B (e.g., the same side of substrate 805 as sense electrodes 806 and their corresponding routing traces 814) (e.g., the second layer). In some examples, dummy traces (e.g., traces tied to ground, a reference voltage, or any other fixed source) can be arranged along gaps 830 and/or 832 to act a shield (e.g., to also reduce cross-talk coupling from grounded objects (e.g., fingers or the grip of the device including the touch sensor panel), which might otherwise necessitate a compensation mechanism).

FIG. 8C illustrates an exemplary touch sensor panel configuration 801 of electrodes 808 along the right-side border of a touch sensor panel of this disclosure (e.g., the same right-side border as in FIG. 8A). In some examples, it can be beneficial to isolate or shield the routing traces 810 of touch node electrodes 808 from potential sources of noise (e.g., because self-capacitance measurements can be more sensitive to noise than mutual capacitance measurements). Thus, in configuration 801 of FIG. 8C, routing traces 814 for sense electrodes 806 (not shown) can be routed to touch sensing circuitry separately from routing traces 810 for touch node electrodes 808 (e.g., in different regions of the touch sensor panel), thus reducing potential capacitive coupling between routing traces 814 and routing traces 810. For example, routing traces 814 for sense electrodes 806 can be routed to touch sensing circuitry in region 807 between drive/sense electrodes and border-disposed touch node electrodes 808, and routing traces 810 for touch node electrodes 808 can be routed to touch sensing circuitry in region 803 that is outside of touch node electrodes 808, as shown in FIG. 8C. In some examples, electrodes 808 and their corresponding routing traces 810 can be arranged on a first layer (e.g., the same layer as drive electrodes 804 (not shown)).

To provide further shielding to routing traces 810, in some examples, the touch sensor panel can include shield 826 disposed above (e.g., closer to the touch surface of the touch sensor panel) routing traces 810—in other words, shield 826 can be disposed over region 803 of the touch sensor panel (e.g., region 803 can be contained within an area of shield 826). Shield 826 can be a plate or film of conductive material such as ITO that can be electrically coupled to a reference voltage source (e.g., AC or DC) or ground—in some examples, shield 826 can be driven with the same voltage signal with which touch node electrodes 808 are being driven during self-capacitance operation so that capacitive coupling between touch node electrodes 808, traces 810 and shield 826 can be minimized. Shield can be disposed on the second layer (e.g., shield can be formed on the same layer as sense electrodes 806 (not shown)), or on any layer of the touch sensor panel other than the layer on which touch node electrodes 808 are disposed. In some examples, shield 826 can include gaps 834 at the same locations as electrodes 808, the gaps being smaller (e.g., slightly smaller) than the size of electrodes 808 so as to provide effective shielding to traces 810 while allowing electrodes 808 to couple to and detect a finger and/or object near or on the touch sensor panel. In some examples, shield 826 can cover areas in which the touch sensor panel does not include conductive material (e.g., electrodes, routing traces, shields, etc.) at any layer or area of the touch sensor panel for optical uniformity. For example, shield 826 can cover gaps or positions 512 that do not include touch node electrodes 508 in the touch sensor configurations of FIGS. 5A-5D. This can reduce areas of the touch sensor panel that do not include conductive material, which can be visible to the user.

Figure 9A:
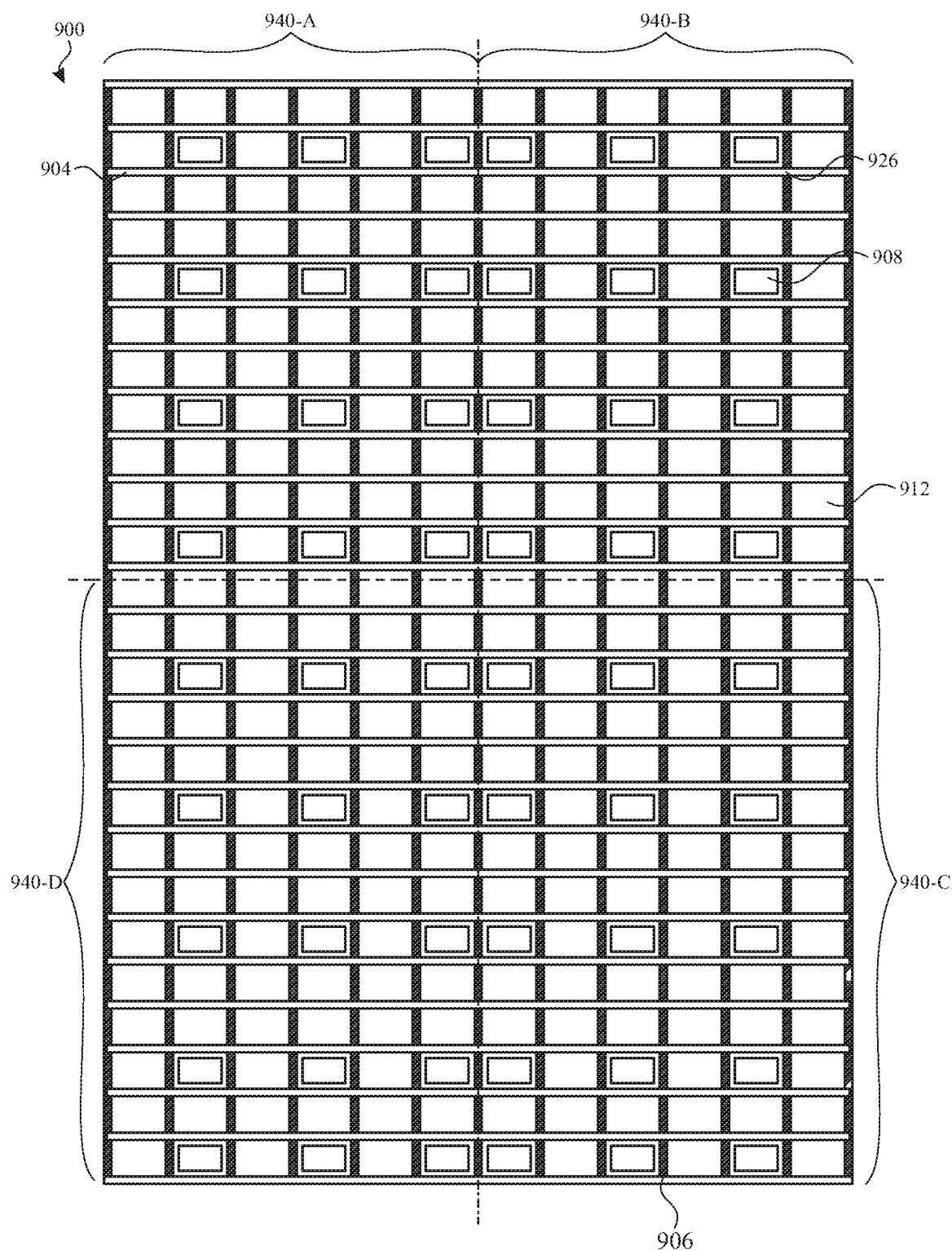
FIGS. 9A-9B illustrate exemplary touch sensor panel configurations in which the touch sensor panel is divided into quadrants according to examples of the disclosure.
Figure 9B:
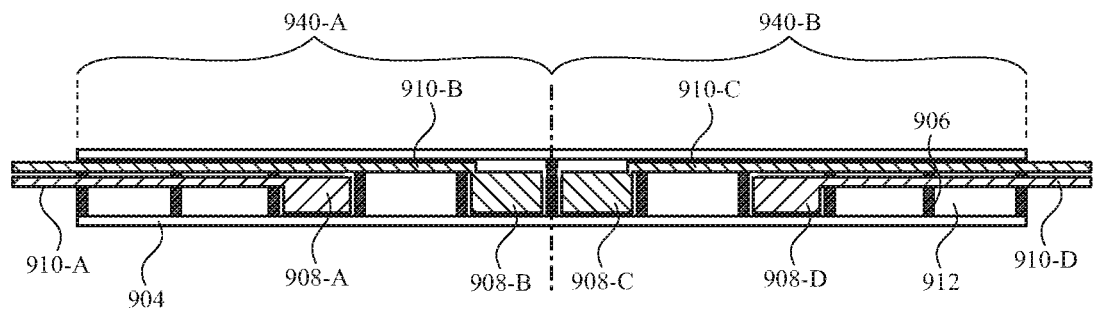

FIGS. 9A-B illustrate exemplary touch sensor panel configurations in which the touch sensor panel of this disclosure can be divided into regions (e.g., quadrants) according to examples of the disclosure. In the example of FIG. 9A, touch sensor panel 900 can be partitioned (symbolically illustrated by broken electrodes) into quadrants 940-*a*, 940-*b*, 940-*c*, and 940-*d*, where each quadrant can have separate sense electrodes 904 and/or drive electrodes 906. The partitioning can shorten the sense electrodes 904 and/or drive electrodes 906 by half, such that the resistance along each electrode can be halved, thereby reducing the effects of electrode resistance on touch sensing. The touch node electrodes 908 disposed within the interior of quadrants 940-*a*, 940-*b*, 940-*c*, and 940-*d* of FIG. 9A can each have one or more of the characteristics described with reference to FIGS. 5A-7B and/or 10A-10E. For example, touch node electrodes 908 in each of these quadrants or regions can be arranged or distributed within each quadrant or region as described with reference to the touch node electrodes in FIGS. 5A-7B and/or 10A-10E (e.g., along one or more sides and/or distributed within the quadrant). In some examples, the routing traces of electrodes 908 can be routed out toward the border(s) of each quadrant, shortening the lengths of those routing traces and allowing for larger and/or equally-sized electrodes 908, as explained in more detail below with reference to FIG. 9B. This configuration can allow the touch sensor panel to detect touch or proximity events in any given quadrant or region or any combination of quadrants or regions, without detecting touch or proximity events in all quadrants or regions. For example, a user may rest the bottom on his hand or palm on a quadrant (e.g., quadrant 940-*c*) while intentionally touching a different quadrant (e.g., using a stylus to touch quadrant 940-*a*), creating intended touch event(s) (e.g., the stylus touch events) and unintended touch event(s) (e.g., the points of contact between the resting hand and the touch sensor panel). In this example, the touch sensor panel can ignore the touch events at quadrant 940-*c* and can detect the intended touch events in quadrant 940-*a* (e.g., focus on quadrant 940-*a*). Partitioning touch sensor panel 900 into quadrants can also reduce the number of ghost touch or proximity events detected by given touch sensing circuitry (e.g., by associating each quadrant with different sensing circuitry), as described above. Moreover, partitioning touch sensor panel 900 into quadrants can also reduce routing trace congestion (e.g., reduce the number routing traces along any given area between the electrodes to the sensing circuitry), because the routing traces for the electrodes in any given partition can be routed in different directions (e.g., along different paths or areas of the touch sensing panel) than the electrodes from other quadrants, also reducing the maximum area occupied by the traces in a given row of the touch sensor panel. Although the touch sensing device of FIG. 9A is partitioned into quadrants, partitioning into other numbers of partitions and/or configurations is also within the scope of this disclosure provided that each partition includes at least one edge of the device for connecting, via routing traces, the sense electrodes, drive electrodes, and touch node electrodes to touch sensing circuitry. In some examples, each partition can have its own dedicated or respective touch sensing circuitry.

FIG. 9B illustrates an enlarged view of an exemplary row containing drive electrodes 904, sense electrodes 906, and touch node electrodes 908-A-908-D from quadrants 940-*a* and 940-*b* of FIG. 9A (the partition between quadrants symbolically illustrated by broken electrodes). Specifically, quadrants 940-*a* and 940-*b* illustrate exemplary drive electrodes 904 and sense electrodes 906 arranged in a row and column configuration, respectively, with electrodes 908A-908D arranged between drive electrodes 904 and sense electrodes 906 (e.g., electrodes 908-A and 908-B in quadrant 940-*a* and electrodes 908-C and 908-D in quadrant 940-*b*). In some examples, the electrodes 908 closer to the partition between quadrants 940*a* and 940*b* (e.g., electrodes 908-B and 908-C) can have substantially the same area as the electrodes 908 further away from the partition (and optionally closer to the borders of the touch sensor panel and/or touch sensing circuitry) (e.g., electrodes 908-A and 908-D), as illustrated in FIG. 9B. The size (e.g., area) of the electrodes 908 can be such that the routing traces for the electrodes 908 closer to the partition (e.g., routing traces 910-B and 910-C) can be routed around (e.g., above or below), and electrically isolated from, the electrodes 908 further away from the partition (e.g., electrodes 908-A and 908-D) and their corresponding routing traces (e.g., routing traces 910-A and 910-D). In some examples, having electrodes 908 of substantially the same size can result in consistent touch sensing characteristics from one electrode to the next.

In some examples, the electrodes 908 closer to the partition between quadrants 940*a* and 940*b* (e.g., electrodes 908-B and 908-C) can have a larger area than the electrodes 908 further away from the partition (and optionally closer to the borders of the touch sensor panel and/or touch sensing circuitry) (e.g., electrodes 908-A and 908-D) such that the routing traces for the electrodes 908 closer to the partition (e.g., routing traces 910-B and 910-C) can be routed around, and electrically isolated from, the electrodes 908 further away from the partition (e.g., electrodes 908-A and 908-D) and their corresponding routing traces (e.g., routing traces 910-A and 910-D). This configuration can allow larger electrodes 908 to be interspersed throughout the touch sensor panel in gaps or positions 912. In some examples, electrodes 908-A to 908-D can be arranged within electronically isolated regions of drive electrodes 904 (e.g., gaps or hollowed out portions) such that electrodes 908-A-908-D and routing traces 910-A-910-D can be driven by the same signal during a mutual capacitance mode of the touch sensor panel, as described above with reference to FIGS. 6A-6C. It should be noted that the electrodes 908 described herein (e.g., with reference to FIGS. 5A-9A and/or 10A-10E) and their corresponding routing traces can be arranged in the manner described with reference to quadrant 940-*a* and/or 940-*b* (e.g., such that the electrodes 908 that are electrically further from the touch sensing circuitry (e.g., because of longer routing traces) are larger than the electrodes 908 electrically closer to the touch sensing circuitry (e.g., because of shorter routing traces)). For example, electrodes 608 and traces 610 of FIG. 6B can be arranged such that electrodes 608 closer to the touch sensing circuitry along the same drive electrode 604 are smaller than the electrodes 608 further to the touch sensing circuitry (e.g., traces 610 can be routed around the other self-capacitance electrodes closer to the touch sensing circuitry along the same drive electrode). In other examples, the electrodes 608 can be substantially the same size (e.g., have substantially the same area).

Figure 10A:
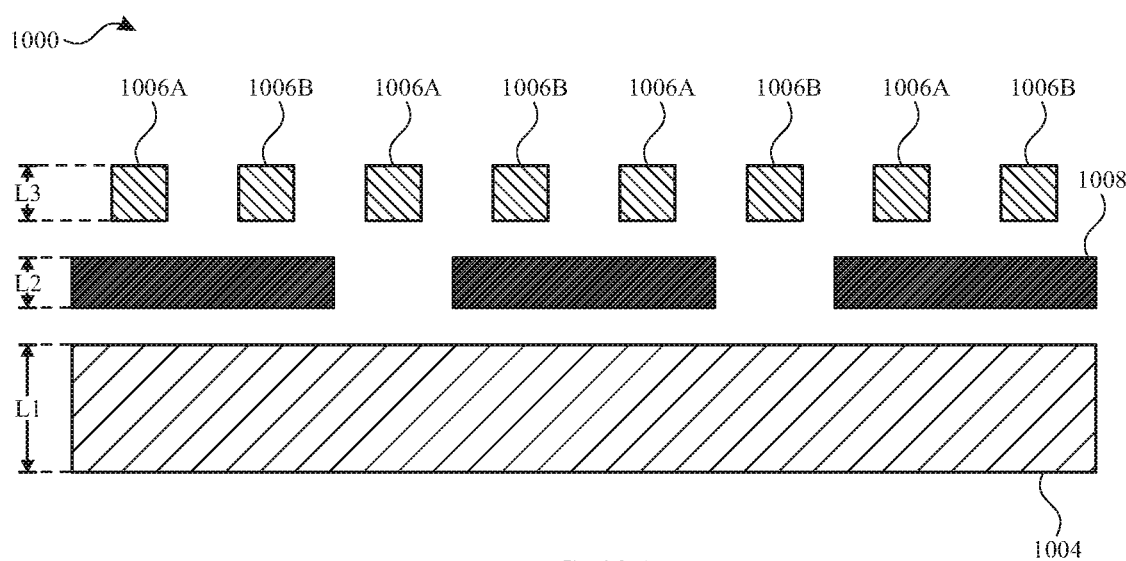
FIGS. 10A-10E illustrate exemplary touch sensor panel configurations according to examples of the disclosure.

FIGS. 10A-10E illustrate additional exemplary touch sensor panel configurations according to examples of the disclosure. For example, the examples of FIGS. 5A-5D can be implemented using the configurations of FIGS. 10A-10E. FIG. 10A illustrates a vertical (e.g., along the Y-axis) cross-sectional view of touch sensor panel 1000 according to examples of the disclosure. Specifically, FIG. 10A shows touch electrodes 1004 disposed on a first layer (e.g., L1), touch electrodes 1008 disposed on a second layer (e.g., L2) above the first layer, and touch electrodes 1006A and dummy electrodes 1006B disposed on a third layer (e.g., L3) above the first and second layers. In some examples, touch electrodes 1004 can correspond to touch electrodes 504 in FIGS. 5A-5D, touch electrodes 1006A can correspond to touch electrodes 506 in FIGS. 5A-5D, and touch electrodes 1008 can correspond to touch electrodes 508 in FIGS. 5A-5D. It should be understood that the each of the layers (e.g., L1-L3) are optionally not electrically coupled to each other (e.g., air and/or non-conductive material, such as dielectric, can fill the areas between the layers and/or between touch electrodes). In some examples, the touch sensor panel 1000 can further include a cover (e.g., a glass cover in a touch screen configuration) (not shown) disposed above layer three (e.g., L3), which can be formed from glass, acrylic, sapphire, or the like. In some examples, a conductive plate (e.g., ITO) can be disposed below the first layer (e.g., below L1, opposite L2). In some examples, this conductive plate can be operated as a guard layer (e.g., can be actively driven at a reference voltage (e.g., AC or DC) or can be coupled to ground or any other fixed voltage source) to reduce noise coupled to touch electrodes 1004, 1006A, and 1008 (e.g., false positives or parasitic coupling), such as described with reference to FIG. 5D. Exemplary details of touch electrodes 1004, 1006A, and 1008 and dummy electrodes 1006B will be described with reference to FIGS. 10B-10E.

Figure 10B:
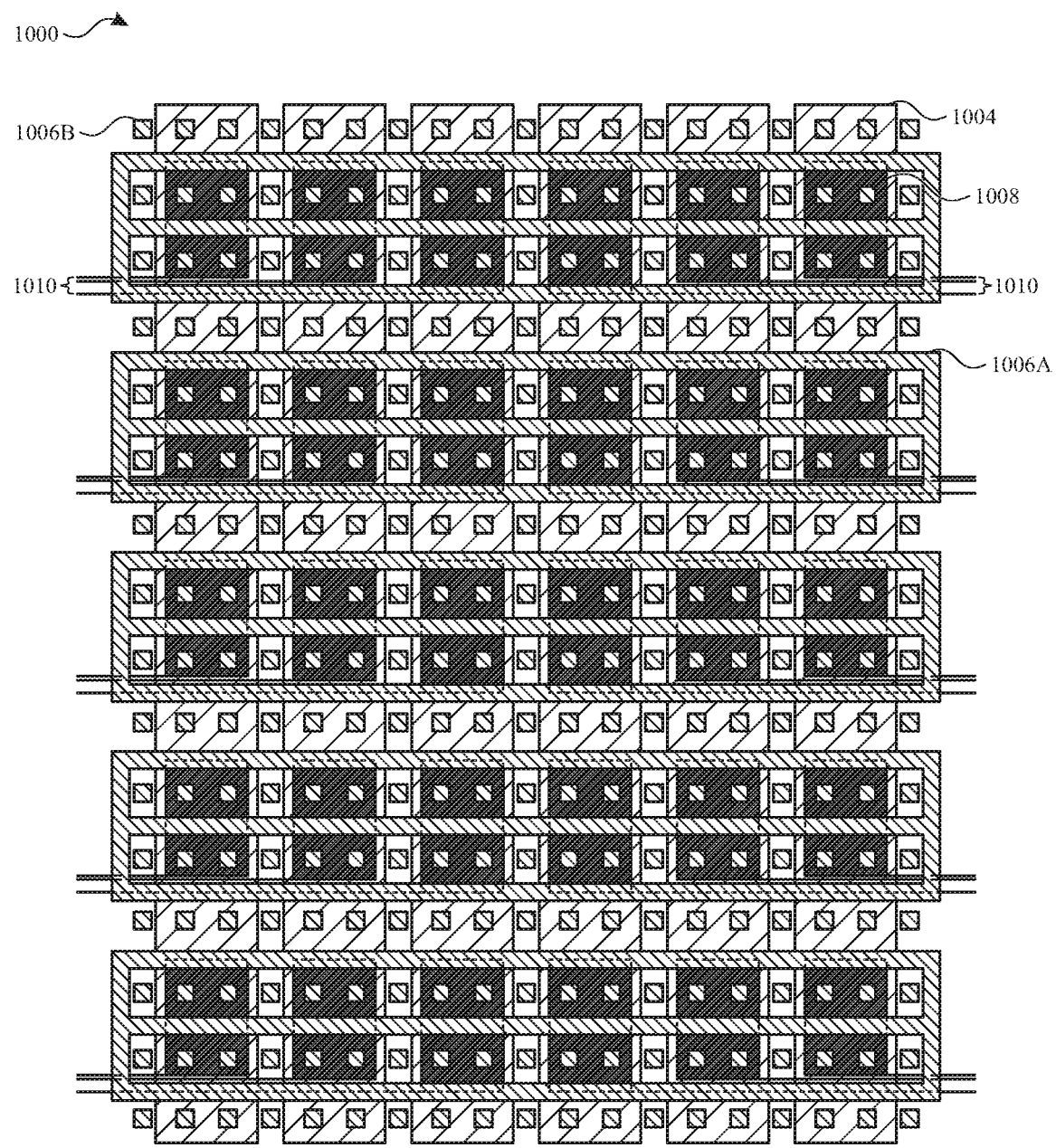

FIG. 10B illustrates a top-down view of touch sensor panel 1000 according to examples of the disclosure. Specifically, touch sensor panel 1000 shows touch electrodes 1004 arranged in a vertical or column configuration disposed on a first layer (e.g., L1 as shown in FIG. 10A), touch electrodes 1008 disposed on a second layer (e.g., L2 as shown in FIG. 10B), and touch electrodes 1006A and dummy electrodes 1006B disposed on a third layer (e.g., L3). As shown in FIG. 10B, touch electrodes 1004 can be elongated with relatively high aspect ratios (e.g., have a larger height than width or vice versa). Similarly, touch electrodes 1006A can also be elongated with relatively high aspect ratios (e.g., each has a larger height than width or vice versa). In some examples, each touch electrode 1006A can comprise a pattern of conductive material. For example, each touch electrode 1006A can be formed by three horizontal rows of conductive material (e.g., ITO) connected by two vertical columns of the same conductive material at the ends, as shown in FIG. 10B. This configuration forms at least two gaps in between the three horizontal rows and two columns of conductive material that form touch electrode 1006A, as shown in FIG. 10B. In some examples, touch electrodes 1004 can be operated as drive electrodes and touch electrodes 1006A can be operated as sense electrodes (and vice versa) for mutual capacitance touch sensing (e.g., as described above with reference to FIG. 4). In some examples, electrodes 1006B can be dummy electrodes (e.g., tied to ground or left floating) for optical uniformity of touch sensor panel 1000.

In some examples, electrodes 1006B can have low aspect ratios (e.g., 1:x, where x is less than 4, less than 5, preferably less than 1.5; lower than the aspect ratios of electrodes 1004 and 1006A) and can be disposed in areas not covered by touch electrodes 1006A on the third layer, including within any gaps within or between touch electrodes 1006 (e.g., as shown in FIG. 10B). In some examples, touch electrodes 1008 can also have low aspect ratios (e.g., 1:x, where x is less than 4, less than 5, preferably less than 1.5; lower than the aspect ratios of electrodes 1004 and 1006A) and can be disposed in between touch electrodes 1004 and 1006A in the second layer of touch sensor panel 1000, as shown in FIG. 10B. It should be understood that while touch electrodes 1008 are optionally arranged directly above touch electrodes 1004 in FIG. 10B (e.g., touch electrodes 1008 overlap with touch electrodes 1004), touch electrodes 1008 can also be arranged in between (or partially in between and partially over) touch electrodes 1004. In some examples, touch electrodes 1004 can include gaps in areas where touch electrodes 1008 would otherwise overlap touch electrodes 1004 to reduce such overlap between the electrodes. In some examples, routing traces 1010 for touch electrodes 1008 (e.g., traces for coupling touch electrodes 1008 to sensing circuitry) can be disposed on the second layer and can extend from the center of touch sensor panel 1000 towards the perimeter of touch sensor panel 1000 as shown in FIG. 10B (e.g., toward the sides). In some examples, the aspect ratio of each touch electrode 1008 can be the same or substantially the same (e.g., relatively low aspect ratio; less than the aspect ratios of electrodes 1004 and electrodes 1006A). In other examples, the aspect ratios of touch electrodes 1008 can vary (e.g., the dimensions can vary between electrodes). For example, the touch electrodes 1008 closer to the middle of touch sensor panel 1000 can have larger surface areas than the touch electrodes 1008 closer to the perimeter of touch sensor panel 1000, as shown in FIG. 10B. In this way, routing traces 1010 of the touch electrodes 1008 closer to the middle of touch sensor panel 1000 can be routed around the touch electrodes 1008 closer to the perimeter of touch sensor panel 1000, as shown in FIG. 10B. In some examples, touch electrodes 1008 can be operated as self-capacitance electrodes for self-capacitance touch sensing (e.g., as described above with reference to FIG. 3). In the example of FIG. 10B, touch electrodes 1008 can be continuous metal plates without any gaps or internal patterns, and touch electrodes 1008 can be spatially contained within a single horizontal electrode 1006A and/or column electrode 1004 (e.g., does not span multiple row electrodes 1006A and/or column electrodes 1004).

Figure 10C:
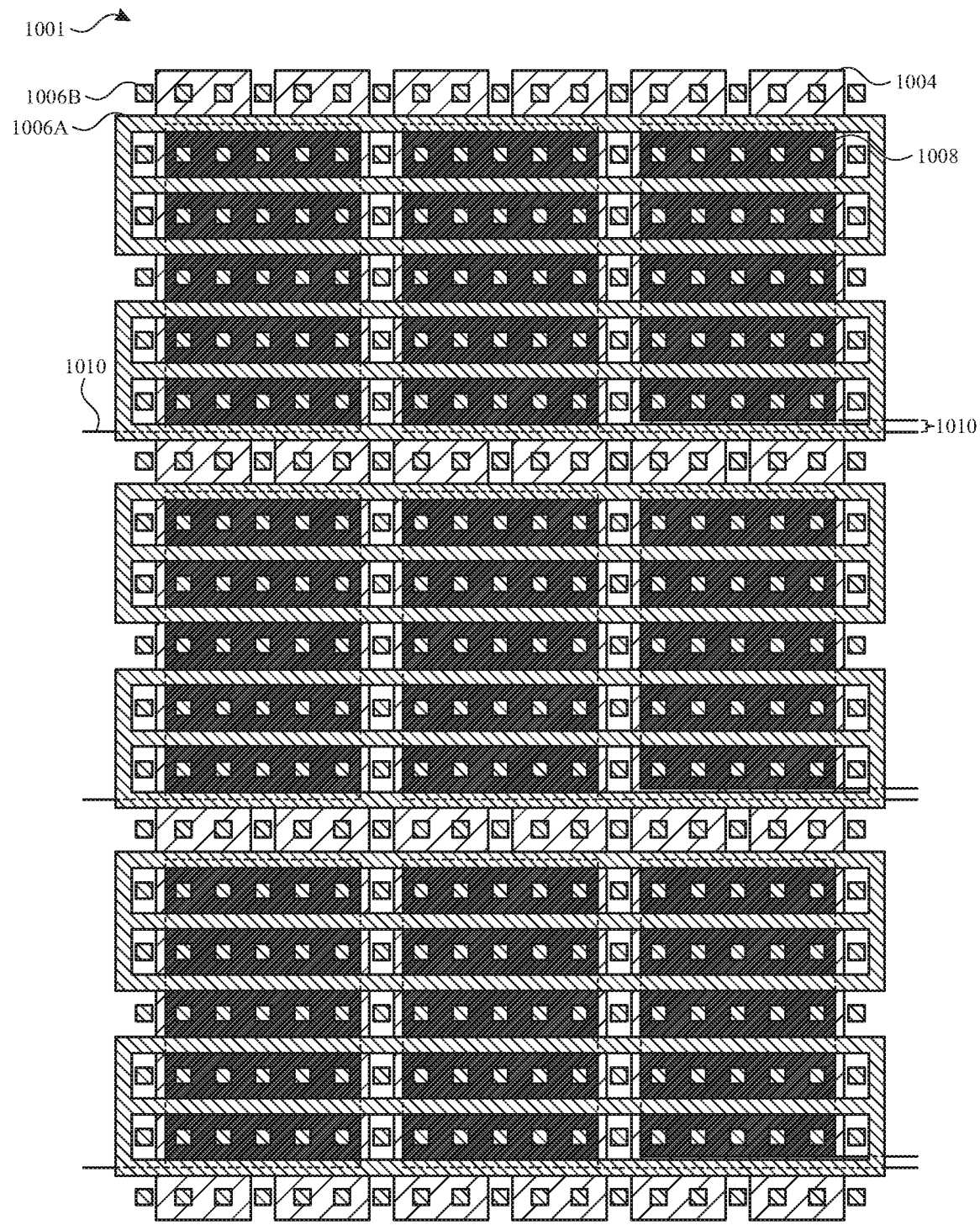

FIG. 10C illustrates another exemplary touch sensor panel 1001 with touch electrodes 1004, 1006A, 1008, dummy electrodes 1006B, and routing traces 1010. In some examples, touch electrodes 1004, 1006A, and dummy electrodes 1006B and routing traces 1010 can be sized and positioned as described above with reference to FIGS. 10A-10B. Touch electrodes 1008 in touch sensor panel 1001, however, can span areas that overlap with multiple touch electrodes 1004 and/or 1006A, as shown in FIG. 10C.

For example, touch electrodes 1008 can be disposed on the second layer (e.g., as described above with reference to FIG. 10A) and can each overlap all or part of the width of two touch electrodes 1004 and/or all or part of the height of two touch electrodes 1006A. In some examples, touch electrodes 1004 can include gaps in areas where touch electrodes 1008 would otherwise overlap touch electrodes 1004 to reduce such overlap between the electrodes. In some examples, the aspect ratio of each touch electrode 1008 can be the same or substantially the same (e.g., relatively low aspect ratio; less than the aspect ratios of electrodes 1004 and electrodes 1006A). In other examples, the aspect ratios of touch electrodes 1008 can vary (e.g., the dimensions can vary between electrodes). For example, the touch electrodes 1008 closer to the middle of touch sensor panel 1001 can have larger surface areas than the touch electrodes 1008 closer to the perimeter of touch sensor panel 1001, as shown in FIG. 10C. In this way, routing traces 1010 of the touch electrodes 1008 closer to the middle of touch sensor panel 1001 can be routed around the touch electrodes 1008 closer to the perimeter of touch sensor panel 1001, as shown in FIG. 10C. In some examples, two or more touch electrodes 1008 can be electrically coupled together and have a single trace 1010 coupling them to sensing circuitry. In some examples, touch electrodes 1008 can be operated as self-capacitance electrodes for self-capacitance touch sensing (e.g., as described above with reference to FIG. 3). In the example of FIG. 10C, touch electrodes 1008 can be continuous metal plates without any gaps or internal patterns, and touch electrodes 1008 can be spatially contained within a single horizontal electrode 1006A and/or column electrode 1004 (e.g., does not span multiple row electrodes 1006A and/or column electrodes 1004).

Figure 10D:
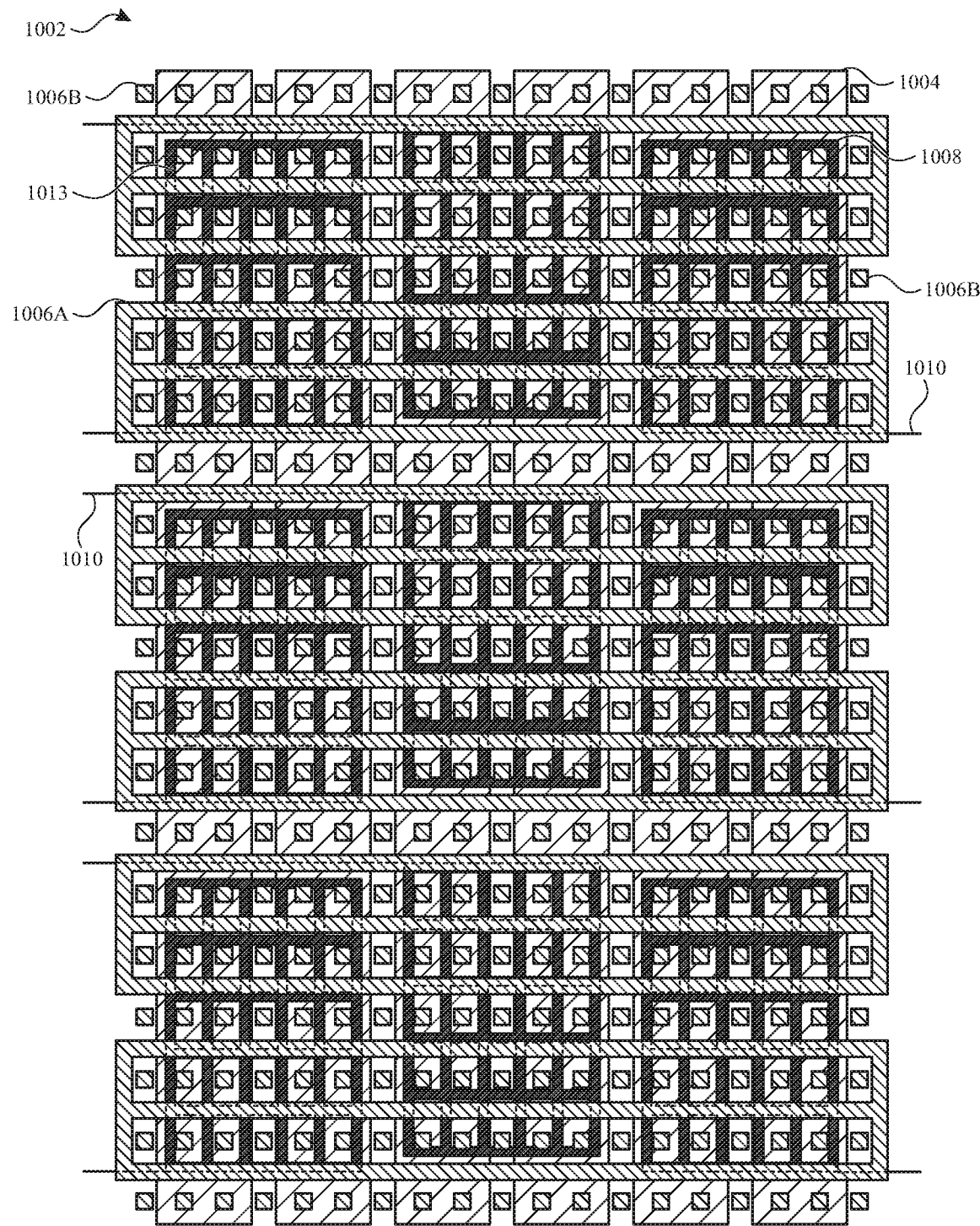

In some examples, touch electrodes 1008 can be patterned to reduce the overlap between touch electrodes 1008 and touch electrodes 1004 and/or touch electrodes 1006A. FIG. 10D illustrates another exemplary touch sensor panel 1002 with touch electrodes 1004, 1006A, 1008, dummy electrodes 1006B, and routing traces 1010. In some examples, touch electrodes 1004 and 1006A, and dummy electrodes 1006B can be sized and positioned as described above with reference to FIGS. 10A-10C. Touch electrodes 1008 in touch sensor panel 1002, however, can comprise a pattern of lattices of conductive material (e.g., a sparse lattice) that includes one or more gaps 1013 (e.g., each touch electrode 1008 can have a grid-like pattern). In this way, overlap between touch electrodes 1008 and touch electrodes 1004 and 1006A, and dummy electrodes 1006B can be reduced. In some examples, the one or gaps 1013 formed by the lattices of conductive material can be rectangular (as shown), square, triangular, or any other shape. In some examples, touch electrodes 1008 can span areas that overlap with multiple touch electrodes 1004 and/or 1006A, as shown in FIG. 10D. For example, touch electrodes 1008 can be disposed on the second layer (e.g., as described above with reference to FIG. 10A) and can each overlap all or part of the width of two touch electrodes 1004 and/or all or part of the height of two touch electrodes 1006A. In the example of FIG. 10D, touch electrodes 1008 can be spatially contained within a single horizontal electrode 1006A and/or column electrode 1004 (e.g., does not span multiple row electrodes 1006A and/or column electrodes 1004). In some examples, touch electrodes 1004 can include gaps in areas where lattices of touch electrodes 1008 would otherwise overlap touch electrodes 1004 to reduce such overlap between the electrodes.

In some examples, the aspect ratio of each touch electrode 1008 can be the same or substantially the same (e.g., relatively low aspect ratio; less than the aspect ratios of electrodes 1004 and electrodes 1006A). For example, touch electrodes can be arranged within the second layer in a staggered manner (e.g., as shown in FIG. 10D). In this way, routing traces 1010 of the touch electrodes 1008 closer to the middle of touch sensor panel 1002 can be routed around the touch electrodes 1008 closer to the perimeter of touch sensor panel 1002 without requiring the touch electrodes 1008 closer to the perimeter of touch sensor panel 1002 to be smaller than the touch electrodes 1008 closer to the middle of touch sensor panel 1002, as shown in FIG. 10D. In other examples, the aspect ratios of touch electrodes 1008 can vary (e.g., the dimensions can vary between electrodes). For example, the touch electrodes 1008 closer to the middle of touch sensor panel 1002 can have larger surface areas than the touch electrodes 1008 closer to the perimeter of touch sensor panel 1002—whether or not the touch electrodes 1008 are arranged in a staggered manner. In this way, routing traces 1010 of the touch electrodes 1008 closer to the middle of touch sensor panel 1002 can be routed around the touch electrodes 1008 closer to the perimeter of touch sensor panel 1002 (e.g., as described above with reference to FIGS. 10B-10C). In some examples, touch electrodes 1008 can be operated as self-capacitance electrodes for self-capacitance touch sensing (e.g., as described above with reference to FIG. 3).

Figure 10E:
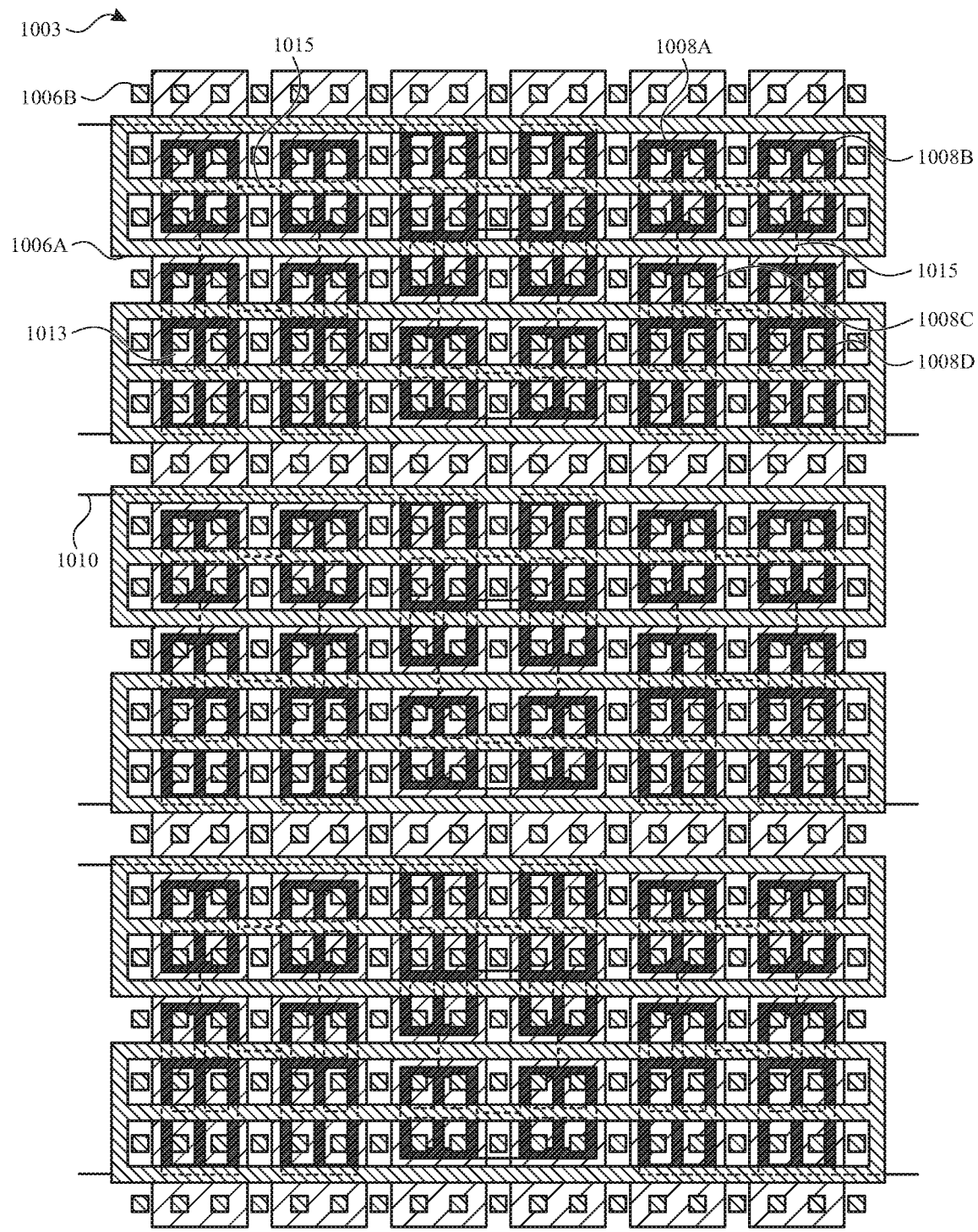

FIG. 10E illustrates another exemplary touch sensor panel 1003 with touch electrodes 1004, 1006A, dummy electrodes 1006B, and routing traces 1010 in which touch electrodes 1008 can be made up of two or more lattice portions with first widths and first heights electrically connected together with lattice portions of second widths, smaller than the first widths, and/or second heights, smaller than the first heights, to further reduce the overlap between touch electrodes 1008 and electrodes 1004 and/or electrodes 1006A. For example, lattice portions 1008A-1008D in touch sensor panel 1003 can comprise a pattern of lattices of conductive material (e.g., sparse lattices) that includes one or more gaps 1013 (e.g. each of lattice portions 1008A-1008D can have a grid-like pattern) and can be electrically coupled together by traces or connecting bridges 1015 to form a touch electrode 1008. In some examples, the one or gaps 1013 formed by the lattices of conductive material can be rectangular (as shown), square, triangular, or any other shape. In some examples, bridges 1015 can have widths that are smaller than the widths of the portions that make up the lattice portions of electrodes 1008. In some examples, bridges 1015 can be located in areas between electrodes 1004 (e.g., connecting together two lattice portions contained within the areas of two different electrodes 1004) and/or in areas that cross an outer boundary of electrodes 1006A (e.g., connecting together two lattice portions that overlap with two different electrodes 1006A). In some examples, the lattices of conductive material in touch sensor panel 1003 of FIG. 10E can be thicker than the lattices of conductive material in touch sensor panel 1002 of FIG. 10D. In some examples, the lattices of conductive material in touch sensor panel 1003 of FIG. 10E can be equal to or thinner than the lattices of conductive material in touch sensor panel 1002 of FIG. 10D. In some examples, lattice portions 1008A-1008D can have varying widths and/or heights within touch sensor panel 1003 (e.g., lattice portions 1008A-1008D can have varying aspect ratios). In some examples, lattice portions 1008A-1008D are arranged directly above touch electrodes 1004 (e.g., each of lattice portions 1008A-1008D overlap with touch electrodes 1004), as shown in FIG. 10E. In some examples, lattice portions 1008A-1008D can be arranged in between (or partially in between and partially over) touch electrodes 1004. In some examples, touch electrodes 1004 can include gaps in areas where one or more lattice portions 1008A-1008D would otherwise overlap touch electrodes 1004 to reduce such overlap between the electrodes. In some examples, one or more of lattice portions 1008A-1008D can span areas that overlap with multiple touch electrodes 1004 and/or 1006A. In some examples, the touch electrodes formed by coupling lattice portions 1008A-1008D can span areas that overlap with multiple touch electrodes 1004 and/or 1006A. For example, the touch electrode formed by coupling lattice portions 1008A-1008D can overlap all or part of the width of two touch electrodes 1004 and/or all or part of the height of two touch electrodes 1006A (e.g., as shown in FIG. 10E).

In some examples, the total electrode area of the coupled lattice portions can be substantially equal (e.g., within 5%, 10%, 15% of one another) from one group of coupled lattice portions to another group of coupled lattice portions, even though in some examples, the sizes/placement of those lattice portions in the groups of lattice portions can differ (e.g., as shown in FIG. 10E, where some groups of lattice portions have smaller lattice portions in their top portions, and larger lattice portions in their bottom portions, and other groups of lattice portions have larger lattice portions in their top portions, and smaller lattice portions in their bottom portions). In some examples, each of the touch electrodes formed by coupling lattice portions 1008A-1008D can be arranged within the second layer in a staggered manner (e.g., as shown in FIG. 10E). In some examples, touch electrodes formed by coupling lattice portions 1008A-1008D can be operated as self-capacitance electrodes for self-capacitance touch sensing (e.g., as described above with reference to FIG. 3). In some examples, touch electrodes 1004, 1006A, dummy electrodes 1006B, and routing traces 1010 can be sized and positioned as described above with reference to FIGS. 10A-10D. In the example of FIG. 10E, one or more of touch electrodes 1008A-1008D can be spatially contained within a single horizontal electrode 1006A and/or column electrode 1004 (e.g., does not span multiple row electrodes 1006A and/or column electrodes 1004).

Thus, the examples of the disclosure provide various touch sensor panel configurations that include touch electrodes that operate in self-capacitance and mutual capacitance configurations, which can improve the touch sensing performance of the system while reducing the number of electrodes and corresponding routing traces.

Therefore, according to the above, some examples of the disclosure are directed to a touch sensor panel comprising: a first set of touch electrodes configured to operate as drive lines and disposed in a first layer of the touch sensor panel; a second set of touch electrodes configured to operate as sense lines and disposed in a second layer of the touch sensor panel, different than the first layer of the touch sensor panel, wherein one or more mutual capacitance touch nodes are formed by the first set of touch electrodes and the second set of touch electrodes; and a third set of touch electrodes configured to operate as self-capacitance electrodes and disposed in the first layer or the second layer of the touch sensor panel. Additionally or alternatively to one or more of the examples disclosed above, in some examples, the third set of touch electrodes is disposed in the first layer of the touch sensor panel. Additionally or alternatively to one or more of the examples disclosed above, in some examples, the third set of touch electrodes is disposed in the second layer of the touch sensor panel between electrodes of the second set of touch electrodes. Additionally or alternatively to one or more of the examples disclosed above, in some examples, the third set of touch electrodes is disposed along a border of the touch sensor panel. Additionally or alternatively to one or more of the examples disclosed above, in some examples, the third set of touch electrodes is disposed between one or more mutual capacitance touch nodes. Additionally or alternatively to one or more of the examples disclosed above, the first set of touch electrodes is disposed along a first direction in the first layer; and the second set of touch electrodes is disposed along a second direction, different than the first direction, in the second layer. Additionally or alternatively to one or more of the examples disclosed above, a first set of routing traces configured to electrically couple the first set of touch electrodes to sense circuitry; a second set of routing traces configured to electrically couple the second set of touch electrodes to the sense circuitry; and a third set of routing traces configured to electrically couple the third set of touch electrodes to the sense circuitry. Additionally or alternatively to one or more of the examples disclosed above, the touch electrodes in the first set of touch electrodes include one or more voids; and the touch electrodes in the third set of touch electrodes are disposed in the first layer inside the voids in the touch electrodes of the first set of touch electrodes. Additionally or alternatively to one or more of the examples disclosed above, the third set of routing traces extends along the first direction inside the voids in the touch electrodes of the first set of touch electrodes in the first layer toward one or more edges of the touch sensor panel. Additionally or alternatively to one or more of the examples disclosed above, the first set of touch electrodes and the third set of touch electrodes are driven to operate as the drive lines during a mutual capacitance mode of the touch sensor panel. Additionally or alternatively to one or more of the examples disclosed above, the routing traces of the third set of routing traces coupled to touch electrodes of the third set of touch electrodes that are closer to a center of the touch sensor panel are routed around electrodes of the third set of electrodes that are closer to an edge of the touch sensor panel; and the touch electrodes of the third set of touch electrodes vary in size such that the touch electrodes of the third set of touch electrodes that are closer to the edge of the touch sensor panel are smaller than the touch electrodes of the third set of touch electrodes that are closer to the center of the touch sensor panel. Additionally or alternatively to one or more of the examples disclosed above, the third set of touch electrodes and the third set of routing traces are disposed in the second layer of the touch sensor panel such that the third set of touch electrodes and the third set of routing traces are disposed along the second direction between touch electrodes of the second set of touch electrodes. Additionally or alternatively to one or more of the examples disclosed above, the third set of touch electrodes is disposed: between the one or more mutual capacitance touch nodes on the touch sensor panel; and along a border of the touch sensor panel. Additionally or alternatively to one or more of the examples disclosed above, a first area between the touch electrodes of the third set of touch electrodes disposed along the border of the touch sensor panel and an edge of the touch sensor panel, wherein: routing traces of the third set of routing traces corresponding to the touch electrodes disposed between the one or more mutual capacitance touch nodes are disposed at least partially within the first area and extend at least partially along the first area. Additionally or alternatively to one or more of the examples disclosed above, a first area between the touch electrodes of the third set of touch electrodes disposed along the border of the touch sensor panel and the one or more mutual capacitance touch nodes, wherein: routing traces of the third set of routing traces corresponding to the touch electrodes disposed between the one or more mutual capacitance touch nodes are disposed at least partially within the first area and extend at least partially along the first area. Additionally or alternatively to one or more of the examples disclosed above, the third set of touch electrodes is disposed in the second layer of the touch sensor panel, and the third set of routing traces is disposed in the first layer of the touch sensor panel. Additionally or alternatively to one or more of the examples disclosed above, the touch sensor panel is divided into quadrants such that the first set of touch electrodes, the second set of touch electrodes, and the third set of touch electrodes are each divided into the quadrants such that touch electrodes in a first quadrant of the quadrants can be sensed separately from touch electrodes from a second quadrant, different than the first quadrant, of the quadrants.

Some examples of the disclosure are directed to a touch sensor panel comprising: a first set of touch electrodes configured to operate as drive lines during a mutual capacitance measurement mode of the touch sensor panel; a second set of touch electrodes configured to operate as sense lines during the mutual capacitance measurement mode of the touch sensor panel; and a third set of touch electrodes configured to operate as self-capacitance touch electrodes during a self-capacitance measurement mode of the touch sensor panel, wherein during the self-capacitance measurement mode of the touch sensor panel, changes in the self-capacitance of the third set of touch electrodes are sensed while the first set or the second set of touch electrodes are actively driven at a voltage. Additionally or alternatively to one or more of the examples disclosed above, actively driving the first set or the second set of touch electrodes during the self-capacitance measurement mode of the touch sensor panel includes sensing changes in the self-capacitance of the first set or the second set of touch electrodes. Additionally or alternatively to one or more of the examples disclosed above, actively driving the first set or the second set of touch electrodes during the self-capacitance measurement mode of the touch sensor panel includes driving the second set of touch electrodes at the voltage without sensing changes in capacitance of the second set of touch electrodes. Additionally or alternatively to one or more of the examples disclosed above, during the mutual capacitance mode of the touch sensor panel: pairs of touch electrodes of the third set of touch electrodes are driven such that a first touch electrode in each pair of touch electrodes acts as a sense electrode and a second touch electrode in each pair of touch electrodes acts as a drive electrode such that mutual capacitance touch nodes are formed by the first touch electrode and the second touch electrode in each pair of touch electrodes, and changes in capacitance at the mutual capacitance touch nodes between the first touch electrode and the second touch electrode in the pairs are sensed.

Some examples of the disclosure are directed to a method for operating a touch sensor panel, the method comprising: operating a first set of touch electrodes that are disposed in a first layer of the touch sensor panel as drive lines; operating a second set of touch electrodes that are disposed in a second layer of the touch sensor panel, different than the first layer of the touch sensor panel, as sense lines, wherein one or more mutual capacitance touch nodes are formed by the first set of touch electrodes and the second set of touch electrodes; and operating a third set of touch electrodes that are disposed in the first layer or the second layer of the touch sensor panel as self-capacitance electrodes.

Some examples of the disclosure are directed to a non-transitory computer readable storage medium storing one or more programs, the one or more programs comprising instructions, which when executed by a processor, cause the processor to perform a method comprising: operating a first set of touch electrodes that are disposed in a first layer of the touch sensor panel as drive lines; operating a second set of touch electrodes that are disposed in a second layer of the touch sensor panel, different than the first layer of the touch sensor panel, as sense lines, wherein one or more mutual capacitance touch nodes are formed by the first set of touch electrodes and the second set of touch electrodes; and operating a third set of touch electrodes that are disposed in the first layer or the second layer of the touch sensor panel as self-capacitance electrodes.

Some examples of the disclosure are directed to a method for operating a touch sensor panel, the method comprising: during a mutual capacitance measurement mode of the touch sensor panel: operating a first set of touch electrodes as drive lines; and operating a second set of touch electrodes as sense lines; and during a self-capacitance measurement mode of the touch sensor panel: operating a third set of touch electrodes as self-capacitance touch electrodes; and sensing changes in self-capacitance of the third set of touch electrodes while actively driving the first set or the second set of touch electrodes at a voltage.

Some examples of the disclosure are directed to a non-transitory computer readable storage medium storing one or more programs, the one or more programs comprising instructions, which when executed by a processor, cause the processor to perform a method comprising: during a mutual capacitance measurement mode of the touch sensor panel: operating a first set of touch electrodes as drive lines; and operating a second set of touch electrodes as sense lines; and during a self-capacitance measurement mode of the touch sensor panel: operating a third set of touch electrodes as self-capacitance touch electrodes; and sensing changes in self-capacitance of the third set of touch electrodes while actively driving the first set or the second set of touch electrodes at a voltage.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch sensor panel comprising:
  a first set of touch electrodes configured to operate as drive electrodes of one or more mutual capacitance touch nodes during a first mode of the touch sensor panel and operate as electrodes other than self-capacitance electrodes during a second mode of the touch sensor panel;
  a second set of touch electrodes configured to operate as sense electrodes of the one or more mutual capacitance touch nodes during the first mode of the touch sensor panel, wherein the one or more mutual capacitance touch nodes are formed by the first set of touch electrodes and the second set of touch electrodes; and
  a third set of touch electrodes configured to operate as self-capacitance electrodes during the second mode of the touch sensor panel and operate as drive electrodes of the one or more mutual capacitance touch nodes during the first mode of the touch sensor panel, wherein the first mode and the second mode of the touch sensor panel are non-overlapping in time.

2. The touch sensor panel of claim 1, wherein:
the third set of touch electrodes is disposed in a first layer of the touch sensor panel.

3. The touch sensor panel of claim 1, wherein:
the third set of touch electrodes is disposed in a second layer of the touch sensor panel between electrodes of the second set of touch electrodes.

4. The touch sensor panel of claim 1, wherein:
the third set of touch electrodes is disposed along a border of the touch sensor panel.

5. The touch sensor panel of claim 1, wherein:
the third set of touch electrodes is disposed between one or more mutual capacitance touch nodes.

6. The touch sensor panel of claim 1, wherein:
the first set of touch electrodes is disposed along a first direction in a first layer; and
the second set of touch electrodes is disposed along a second direction, different than the first direction, in a second layer.

7. The touch sensor panel of claim 6, further comprising:
a first set of routing traces configured to electrically couple the first set of touch electrodes to sense circuitry;
a second set of routing traces configured to electrically couple the second set of touch electrodes to the sense circuitry; and
a third set of routing traces configured to electrically couple the third set of touch electrodes to the sense circuitry.

8. The touch sensor panel of claim 7, wherein:
the third set of routing traces extends along a first direction in the touch electrodes of the first set of touch electrodes in the first layer toward one or more edges of the touch sensor panel.

9. The touch sensor panel of claim 8, wherein:
the first set of touch electrodes and the third set of touch electrodes are driven to operate as the drive electrodes during the first mode of the touch sensor panel.

10. The touch sensor panel of claim 7, wherein:
the routing traces of the third set of routing traces coupled to touch electrodes of the third set of touch electrodes that are closer to a center of the touch sensor panel are routed around electrodes of the third set of electrodes that are closer to an edge of the touch sensor panel; and
the touch electrodes of the third set of touch electrodes vary in size such that the touch electrodes of the third set of touch electrodes that are closer to the edge of the touch sensor panel are smaller than the touch electrodes of the third set of touch electrodes that are closer to the center of the touch sensor panel.

11. The touch sensor panel of claim 7, wherein:
the third set of touch electrodes and the third set of routing traces are disposed in the second layer of the touch sensor panel such that the third set of touch electrodes and the third set of routing traces are disposed along the second direction between touch electrodes of the second set of touch electrodes.

12. The touch sensor panel of claim 7, wherein:
the third set of touch electrodes is disposed:
between the one or more mutual capacitance touch nodes on the touch sensor panel; and
along a border of the touch sensor panel.

13. The touch sensor panel of claim 12, further comprising:
a first area between the touch electrodes of the third set of touch electrodes disposed along the border of the touch sensor panel and an edge of the touch sensor panel, wherein:
routing traces of the third set of routing traces corresponding to the touch electrodes disposed between the one or more mutual capacitance touch nodes are disposed at least partially within the first area and extend at least partially along the first area.

14. The touch sensor panel of claim 12, further comprising:
a first area between the touch electrodes of the third set of touch electrodes disposed along the border of the touch sensor panel and the one or more mutual capacitance touch nodes, wherein:
routing traces of the third set of routing traces corresponding to the touch electrodes disposed between the one or more mutual capacitance touch nodes are disposed at least partially within the first area and extend at least partially along the first area.

15. The touch sensor panel of claim 7, wherein:
the third set of touch electrodes is disposed in the second layer of the touch sensor panel, and the third set of routing traces is disposed in the first layer of the touch sensor panel.

16. The touch sensor panel of claim 7, wherein:
the touch sensor panel is divided into quadrants such that the first set of touch electrodes, the second set of touch electrodes, and the third set of touch electrodes are each divided into the quadrants such that touch electrodes in a first quadrant of the quadrants can be sensed separately from touch electrodes from a second quadrant, different than the first quadrant, of the quadrants.

17. A method for operating a touch sensor panel, the method comprising:
operating a first set of touch electrodes of the touch sensor panel as drive electrodes of one or more mutual capacitance touch nodes during a first mode of the touch sensor panel and operate as electrodes other than self-capacitance electrodes during a second mode of the touch sensor panel;
operating a second set of touch electrodes of the touch sensor panel as sense electrodes of the one or more mutual capacitance touch nodes during the first mode of the touch sensor panel, wherein one or more mutual capacitance touch nodes are formed by the first set of touch electrodes and the second set of touch electrodes; and
operating a third set of touch electrodes as self-capacitance electrodes during the second mode of the touch sensor panel and as drive electrodes of the one or more mutual capacitance touch nodes during the first mode of the touch sensor panel,
wherein the first mode and the second mode of the touch sensor panel are non-overlapping in time.

18. A non-transitory computer readable storage medium storing one or more programs, the one or more programs comprising instructions, which when executed by a processor, cause the processor to perform a method comprising:
operating a first set of touch electrodes of a touch sensor panel as drive electrodes of one or more mutual capacitance touch nodes during a first mode of the touch sensor panel and operate as electrodes other than self-capacitance electrodes during a second mode of the touch sensor panel;
operating a second set of touch electrodes of the touch sensor panel as sense electrodes of the one or more mutual capacitance touch nodes during the first mode of the touch sensor panel, wherein one or more mutual capacitance touch nodes are formed by the first set of touch electrodes and the second set of touch electrodes; and
operating a third set of touch electrodes as self-capacitance electrodes during the second mode of the touch sensor panel and as drive electrodes of the one or more mutual capacitance touch nodes during the first mode of the touch sensor panel,
wherein the first mode and the second mode of the touch sensor panel are non-overlapping in time.

* * * * *